(12) United States Patent
Erdman et al.

(10) Patent No.: US 6,348,752 B1
(45) Date of Patent: Feb. 19, 2002

(54) INTEGRAL MOTOR AND CONTROL

(75) Inventors: David M. Erdman; Dale F. Yoder; Richard S. Tatman; David T. Molnar, all of Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 07/863,900

(22) Filed: Apr. 6, 1992

(51) Int. Cl.$^7$ ............................. H02K 1/06; H02K 5/00
(52) U.S. Cl. ..................... 310/217; 310/254; 310/68 B; 310/194; 310/156; 310/90; 310/89; 318/794
(58) Field of Search ................. 310/68 B, 156, 310/162, 164, 179, 187, 191, 192, 216, 217, 254, 258; 318/794, 795

(56) References Cited

U.S. PATENT DOCUMENTS

| | | | |
|---|---|---|---|
| 3,333,172 A | 7/1967 | Brailsford | 318/138 |
| 3,375,422 A | 3/1968 | Boudigues | 318/138 |
| 3,569,806 A | 3/1971 | Brailsford | 318/254 |
| 3,759,051 A | 9/1973 | Ohnishi | 62/180 |
| 3,805,134 A | 4/1974 | Osamu et al. | 318/254 |
| 3,831,071 A | 8/1974 | Mitsui | 318/254 |
| 4,099,104 A | 7/1978 | Muller | 318/138 |
| 4,230,976 A | 10/1980 | Müller | 318/138 |
| 4,249,116 A | 2/1981 | Hieda | 318/254 |
| 4,365,187 A | 12/1982 | McDaniel et al. | 318/254 |
| 4,376,261 A | 3/1983 | von der Heide et al. | 318/254 |
| 4,379,984 A | 4/1983 | Müller | 318/254 |
| 4,449,081 A | 5/1984 | Doemen | 318/254 |
| 4,491,772 A | 1/1985 | Bitting | 318/254 |
| 4,544,868 A | 10/1985 | Murty | 318/254 |
| 4,565,956 A | 1/1986 | Zimmerman et al. | 318/721 |
| 4,574,225 A | 3/1986 | Pershall et al. | 318/254 |
| 4,638,223 A | 1/1987 | Tajima et al. | 318/254 |
| 4,642,534 A | 2/1987 | Mitchell | 318/138 |
| 4,651,069 A | 3/1987 | Pellegrini | 318/254 |
| 4,686,437 A | 8/1987 | Langley et al. | 318/254 |
| 4,717,864 A | 1/1988 | Fultz | 318/254 |
| 4,724,365 A | 2/1988 | Müllere | 318/254 |
| 4,734,627 A | 3/1988 | Koerner | 318/254 |
| 4,737,674 A | 4/1988 | Miyao | 310/268 |
| 4,743,815 A | 5/1988 | Gee et al. | 318/254 |
| 4,748,388 A | 5/1988 | Müller | 318/254 |
| 4,760,315 A | 7/1988 | Nanae et al. | 318/254 |
| 4,763,052 A | 8/1988 | Lundin et al. | 318/254 |
| 4,777,419 A | 10/1988 | Obradovic | 318/696 |
| 4,782,272 A | 11/1988 | Buckley et al. | 318/254 |
| 4,929,871 A | * 5/1990 | Gerfast | 318/138 |
| 4,950,960 A | 8/1990 | Krefta et al. | 318/254 |
| 5,040,286 A | 8/1991 | Stark | 29/598 |

FOREIGN PATENT DOCUMENTS

| | | |
|---|---|---|
| EP | 0458211 | 11/1991 |
| JP | 60-121988 | 6/1985 |
| JP | 61-218391 | 9/1986 |

* cited by examiner

Primary Examiner—Karl Tamai
(74) Attorney, Agent, or Firm—Damian Wasserbauer, Esq.; Armstrong Teasdale LLP

(57) ABSTRACT

An energy efficient low-power integral electronically commutated fan motor and control circuit assembly mounted on a circuit board for use in refrigerators utilizing a Hall sensor to provide positional control signals for sequential energization of the windings with the Hall sensor energization being pulsed, and the motor stator windings energized only during a portion of the period, when rotational torque produced by the energization is greatest in order to reduce the power input to the assembly. Integrally molded multifunction components including the coil bobbin, ground pin, Hall sensor holder, motor bearing oil well covers, and assembly housing provide positioning, support, and securing assistance along with electrical and magnetic operative connections and positioning. A capacitively coupled bridge power supply is provided to further reduce power consumption, and the motor is protected under fault and stall conditions by a current limiting circuit and a timed retry circuit, and the rotor and stator are designed for adequate starting torque in a refrigerator. Power is supplied to the motor windings through a voltage dropping capacitor connected in series therewith.

13 Claims, 17 Drawing Sheets

INTEGRAL MOTOR AND CONTROL

BACKGROUND OF THE INVENTION

The present invention relates to an integral, low power, high efficiency motor and control particularly suitable for use in applications where high reliability and high efficiency are particularly important, such as, for example, household refrigeration systems.

In conventional refrigerators of the residential or household type a compressor pumps a circulating refrigerant such as freon to a condenser coil where heat is extracted. The condenser coil is typically positioned on the exterior of the refrigerator, and air circulates over and around the condenser coils (with or without assistance from a fan or blower) to extract heat therefrom. The cooled refrigerant is then circulated through an evaporator coil within the refrigerator, typically in a freezer compartment, to cool the space within the refrigerator. The refrigerant then circulates to the compressor and thence back to the condenser. This cycle continues until the temperature within the refrigerator reaches a desired preselected temperature as sensed by a thermostat or temperature control. A small motor driven evaporator fan is normally provided within the freezer compartment to circulate air over the evaporator coils, through the freezer compartment, and between the freezer compartment and the remainder of the refrigerator.

A conventional fan motor is typically a low power motor having a power input in the range of 8.5 to 13.5 watts with an output power of approximately 2.5 watts. Thus, it will be understood that the efficiency of conventional evaporator fan motors is generally in the order of less than 30%. It also should now be understood that 70% or more of the electric power supplied to such motors is converted to heat within the refrigerator (or freezer compartment), and such heat must be removed from the interior of the refrigerator by the refrigeration system. Thus, inefficient evaporator fan motor operation is undesirably leveraged, because each watt of heat released in the freezer increases the cooling and thus power demands on the refrigerant compressor motor and the remainder of the system. Typically, with other things being held constant, the release of one extra watt of heat inside a refrigerator requires in excess of one extra watt of compressor motor power to remove each such watt of heat generated within the refrigerator. Even with a highly efficient refrigeration system it would typically require in excess of 1.2 additional watts of input power to compressor and condenser fan motors compensate for each additional watt of power dissipated by an evaporator fan motor inside the refrigerated compartment. This amounts to a total power leverage factor of 2.2.

One major objective of the present invention is to provide a new and improved motor and control such that the just referred to undesirable leverage can be viewed as desirable, and used to reduce the overall power consumption by a refrigeration system For example, if one were able to reduce evaporator fan motor input power requirements by an initial 8 watts per hour, then one could reduce the overall refrigerator power requirements by the initial 8 watts plus an additional 7 or more watts (at the compressor and condenser) and this all could amount to as much as 90 kilowatt hours per year, which could represent as much as 10% of the total annual power consumption of a typical household refrigerator.

This power reduction is significant, however, not only in its cost savings to a consumer over the life of a refrigerator, but also in helping to reduce the burning of fossil fuels to generate such power. Moreover, the power savings just mentioned can assist in enabling a refrigerator to meet the power reduction regulations and/or incentives of state and federal governmental bodies.

Public concern about electrical power consumption, is reflected by proposed legislation and U.S. Department of Energy (DOE) regulations, and has emphasized the need to increase the efficiency of household appliances to reduce both the amount of fossil fuel burned, and the need for additional power generation capacity. Public interest and demand is reflected in Energy Guide labels or tags on household appliances which disclose the power requirements and typical cost of operation information.

A still further complication in the redesign of some motors, and particularly refrigerator evaporator fan motors, is the need that the substitute motor fit within the space envelope available in present refrigerator designs, since it would be costly to change existing tooling used in manufacturing refrigerators simply to accommodate differently sized motors. Moreover, it is desirable to utilize a high efficiency motor to replace an existing motor for repair purposes. Thus, it is very desirable that improved motors (and controls when packaged therewith) be usable in existing space envelopes.

In addition there is growing concern over release into the atmosphere of freon refrigerants used in refrigerators and of chemicals used as foaming agents during the manufacture of insulation used in refrigerator walls. Concern over the possible damage to the ozone layer in the earth's atmosphere by CFCs (chloro-fluorocarbons) in the refrigerant is leading to the use of alternate refrigerants. However, presently available alternate refrigerants are less efficient than the freon presently used, so their use would further reduce the efficiency of refrigeration systems. Moreover, the foam insulation used in the walls of refrigerators typically utilizes CFCs as the blowing agent during manufacture, while the use of other known substitute materials result in insulations with reduced R factors. This all further increases the desirability of reducing the amount of heat released by a motor inside a refrigerated enclosure.

The need to further increase the efficiency of electric appliances has led to cash incentives. Various state or local agencies or utility companies (such as in California) offer rebates to new appliance purchasers proportional to the amount of energy saved by using the new appliance. This further increases the continuing demand and need for refrigerators and other appliances with increased efficiency.

As a result of the above considerations considerable research and effort has gone into the redesign of appliances, including components thereof such as motors, in order to increase electric efficiencies, and to meet present or anticipated environmental concerns, with regulations and goals aimed at reducing power consumption by as much as 30%.

Thus, it would be extremely desirable to provide an improved high efficiency fan motor for a household refrigerator which also could be used (with or without modification) as a refrigerant condenser fan motor.

Improved low power motors of the type we contemplate for use in refrigeration systems may advantageously be of the "brushless dc" or "electronically commutated motor" type. However, this type of motor can be damaged if the motor stalls, or ceases to attain desired operating speeds when first starting, or rotates at lower than normal speeds under load conditions. In the absence of a back emf or voltage associated with rotation of the rotor, the applied line voltage may cause excessive current flow through the motor windings which may exceed the rated current carrying capacity of the windings and lead to over-heating and/or failure. Accordingly, it is desirable to provide adequate starting torque, and it is also highly desirable to provide means to detect motor stall, and to provide adequate restarting torque and/or current Limiting in the event of motor stall.

Notwithstanding all of the above, in highly competitive markets such as, for example, the household refrigerator market it is also very important to keep the cost of improved motors to a minimum since many consumers are unwilling, or unable, to pay higher prices for energy saving improvements, notwithstanding the fact that initial costs often are recouped many times over the multiple year life of a machine. Thus, it is important that initial costs for improved products be minimized by providing a readily manufacturable design.

Also, notwithstanding all of the above, it is very important that motors for equipment having a long service life (e.g., household refrigerators) exhibit reliable operation and have a long life in view of consumer expectations and past experience with equipment that requires little or no maintenance for extended periods of continuous use. We have determined that brushless motors combined with solid state control device circuitry can provide the desired good reliability and low maintenance operation.

OBJECTS AND SUMMARY OF THE INVENTION

Accordingly, a primary object of the present invention is to provide a new and improved, integrated and unitary motor and associated control circuit elements having improved operating efficiency.

Another object of the present invention is to provide a new and improved low power integrated and unitary motor and associated control circuit elements suitable for use in refrigeration systems which is cost efficient in operation, yet relatively inexpensive to manufacture in order to minimize the initial cost of the system.

Still another object of the present invention is to provide a new and improved integrated and unitary low power fan motor and associated motor control circuit which is suitable to be used as the condenser or evaporator fan motor in refrigeration systems.

Yet another object of the present invention is to provide an improved high efficiency low power fan motor and control for use in refrigeration systems which provides adequate starting torque and which detects and protects the motor in the event of motor stall.

Still yet another object of the present invention is to provide a low power motor and control circuit in which the fan motor and associated control circuitry elements are combined in an integrated design with unified construction and structural support, and which may be installed in the space in a refrigeration system normally occupied heretofore by only a motor; thus promoting the possibility of direct replacement of existing motors in existing refrigeration system designs.

A further object of the present invention is to provide a new and improved low powered integrated motor and control circuit which is reliable in operation, and which is relatively maintenance free.

Still other objects relate to the provision of a combination of control circuit elements and an electric motor that is of novel mechanical construction, electromagnetic design, and arranged in a unitary package.

In order to attain the above and other related objects, in carrying out the present invention in one form thereof, a direct current electronically commutated DC fan motor is integrally assembled on a circuit board that also carries control circuit elements, with a portion of the motor passing through a region of the circuit board, with a stator coil positioned to one side of the rotor; and with electronic components positioned to the other side of the rotor.

The components of the assembly include integrally molded multifunction components which assist in the positioning, supporting and retention of various electrical and electronic components in proper operative positions. The coil is wound on a bobbin which includes integral means for positioning and securing the coil on the circuit board, to accommodate self-connecting winding terminals which also position, connect, and support the coil on the circuit board, and means for positioning and detachably securing the assembled fan motor and control circuit within the assembly cover or housing, while at the same time preventing movement of the assembly in orthogonal directions.

Motor oil well covers include integrally molded members that facilitate attachment to the motor end shields while also providing a two point axial support system for the integral motor and control assembly within the refrigeration system.

Preferred embodiments of our invention include a low power brushless motor control that utilizes a Hall device to sense the angular position of the rotor to control the commutation of the windings. The Hall sensor is preferably pulsed during a portion of each cycle of operation and its output is sampled for operation and control of the motor in order to provide increased efficiency. It also is preferred to use solid state control circuitry to energize the field coils of the motor only during the periods of their greater efficiency during each power cycle, and discontinuing the energization during the periods of lowered efficiency in order to further realize enhanced power efficiency. Another preferred embodiment of the present invention realizes still further efficiency improvements through the use of a capacitor-feed bridge circuit coupling of the control circuitry to power semiconductors that energize the direct current motor.

A stall or speed sensor is also preferably provided to detect decreased motor speed and motor stall, and apply a periodic starting torque pulse; and also to limit the magnitude and duration of current flow through the motor under fault conditions.

Other objects of the present invention and the advantages realized therefrom will become readily apparent from the following description taken in conjunction with the accompanying drawings in which like reference characters are used to describe like parts throughout the several views.

DESCRIPTION OF THE PREFERRED EMBODIMENTS

Figure 1:
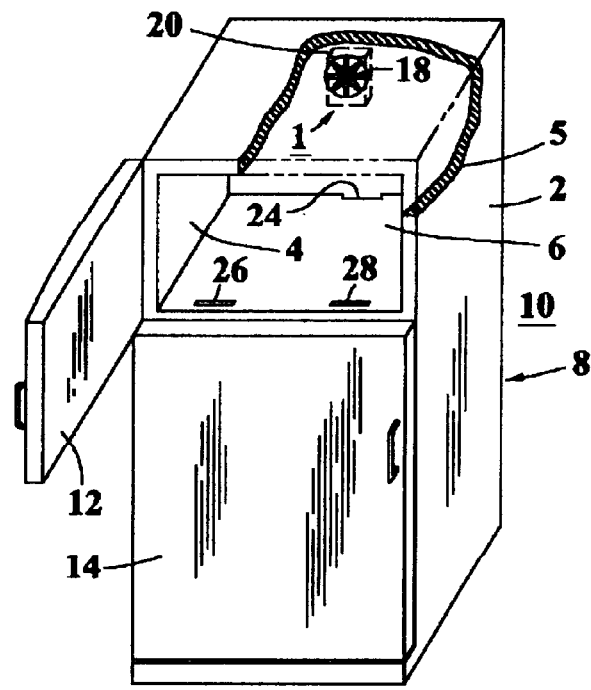
FIG. 1 is a perspective view, partially cut away, of a typical household refrigerator incorporating a motor and control embodying the present invention in one form thereof.

In FIG. 1, a refrigerator 10 is shown incorporating one embodiment of the present invention. The refrigerator includes parallel outer walls 2 and inner walls 4 (with the space therebetween filled with foam insulation 5) and an upper freezer compartment 6 and a lower refrigerator compartment 8. Doors 12 and 14 provide access to the compartments 6, 8. An integral or unitary evaporator fan motor and control circuit assembly 1 which includes a motor and associated control circuit elements is positioned at the rear of the freezer compartment 6 and includes a protective housing or cage (not shown) enclosing a fan 20 fastened to the shaft 18 of the motor 16 which is described in detail below. Although the exact air flow path may be different for different refrigerator designs, in the equipment shown in FIG. 1, refrigerated air is circulated within the freezer compartment 6, and through slots 24, 26, and 28 in the bottom of the freezer compartment into the refrigerator compartment 8.

Figure 2:
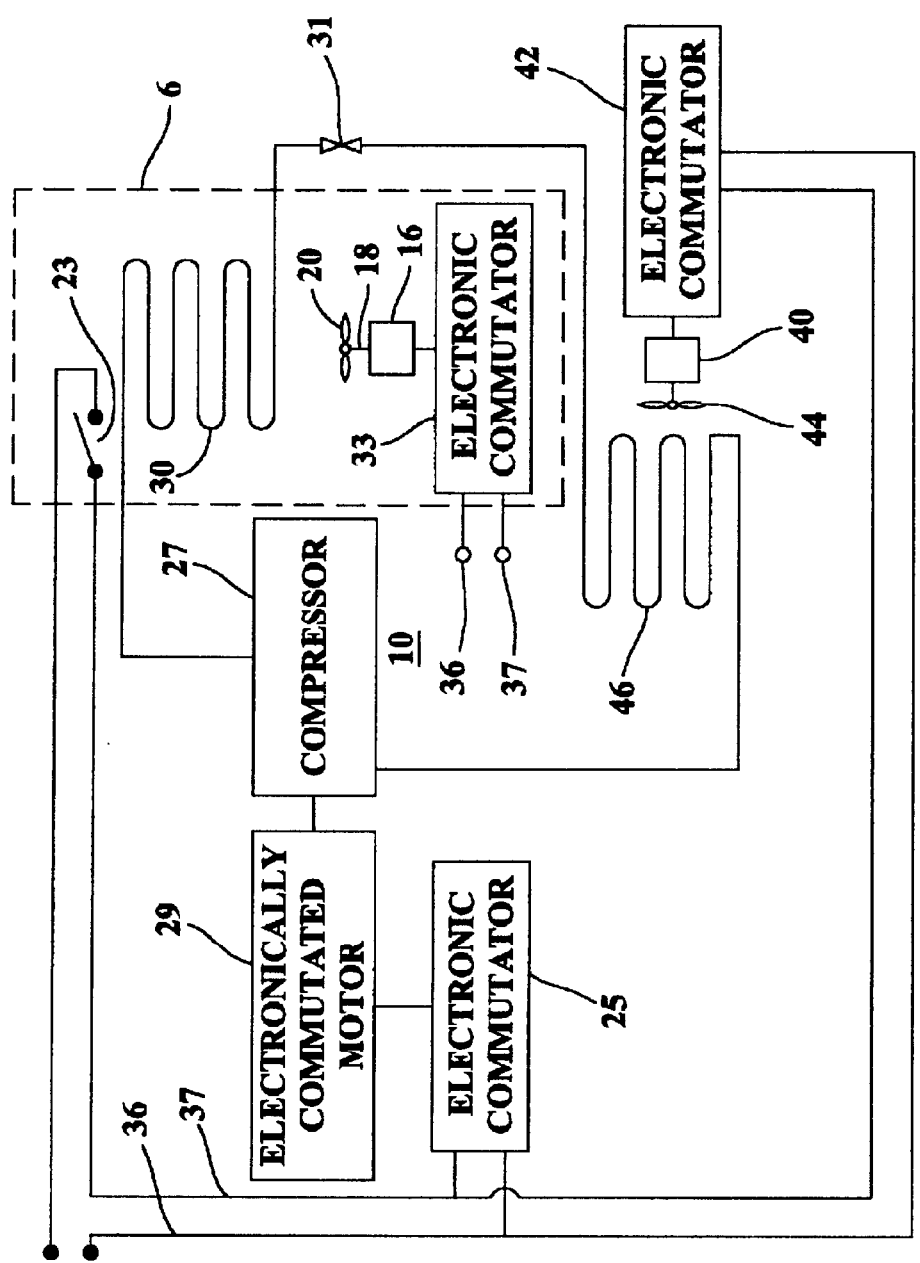
FIG. 2 is a block diagram of the refrigeration system embodied in the refrigerator of FIG. 1.

FIG. 2 shows the interconnection of the major components of the household refrigeration system of FIG. 1. The interior of refrigerator 10 includes a thermostat or temperature sensor 23 which controls operation of the motor 29 which drives compressor 27. The motor 29 may be of electronically commutated type, if desired, through use of electronic commutator 25. Copending United States patent applications, filed Feb. 27, 1991, entitled "Motor Controls, Refrigeration Systems and Methods of Motor Operation and Control," Ser. Nos. 07/661,807 and 07/661,818, by David M. Erdman, one of the inventors of the present patent application, assigned to the same assignee as the present patent application, and the entire disclosure of which is incorporated herein by reference, disclose details of an electronically commutated motor for refrigeration compressor use which is suitable for use in the manner depicted in FIG. 2.

The compressor 27 circulates a refrigerant such as freon sequentially through the condenser coil 46, expansion valve or nozzle 31, and the evaporator coil 30 to cool the compartments 6 and 8 (see FIG. 1) within refrigerator 10. An evaporator fan motor 16 and the evaporator coil 30 are located within the refrigerator interior 6,8, typically in the freezer compartment 6, and fan 20 driven by the motor 16 blows air across and through the evaporator coil to reduce the temperature of the air. The brushless direct current (DC) motor 16 is driven by an electronic commutator control circuit 33 packaged as a unitary component with the motor 16 (as described in detail below) and is energized by power supplied along lines 36 and 37 (upon closure of temperature sensor 23). A second brushless DC motor 40, may be powered by electronic commutator 42, if desired, to drive condenser fan 44 to blow cooling air over the condenser coil 46. The condenser coil 46, fan 44 and condenser fan motor 40 are normally positioned on the rear wall of, or at the bottom of, the refrigerator 10 (outside the refrigerator interior), and the condenser fan motor is energized during the time periods when the compressor motor 29 is energized. Thus, temperature sensor 23 controls the periodic demand energization of the compressor motor 29, evaporator fan motor 16 and condenser fan motor 40.

Referring next to FIGS. 3, 4, 5, 6 and 19, the major components of the assembly 1 are positioned on and within a housing, enclosure, or assembly cover, 50, fabricated of inert resilient plastic to provide an inert and electrically insulating housing. Housing 50 provides electrical isolation and insulation of the electronic circuit components to comply with the "finger probe" test and thus helps prevent accidental shock by a consumer or serviceperson. The cover 50 is also flame-resistant because of the electronics involved, and "pure" from a health consideration because of the presence of food along with moisture within the refrigerator. A suitable material meeting all those requirements has been found to be a polyvinyl chloride available as Geon 87-241 from the B. F. Goodrich Co. Positioned within the housing 50 is the stator 52 and rotor 54 of motor 16 with the rotor positioned within the central region of the housing. The laminated stator core 360 extends into one end region of the housing cover 50 with the coil bobbin 56 and stator coil 58 positioned around the laminations of coil core 390.

Also positioned within the housing 50 and located below hinged cover 60, on the side of the rotor 54 opposite coil 58, are electronic components such as control circuit elements 200 and 361 (see FIGS. 5 and 16–19) on printed circuit board 336, which are protected and isolated by the hinged cover. The hinged cover 60 rotates about hinge 62 that is molded as an indented seam or crease integral with and part of the housing 50. Resilient fingers 64 and 66, also molded integral with the housing 50, on each end of hinged cover 60, extend through slotted passages 68 and 70 molded in the sides of the housing 50. The resilient fingers 64 and 66 are contoured to provide a camming action such that the application of manual pressure to the hinged cover 60 forces the resilient fingers or jaws 64 and 66 toward one another until the tapered extensions 74 and 76 extend through the slots 70 and 72, whereupon they snap away from each other and overlie the inner ends of slots 68 and 70, respectively, securing the hinged cover firmly in place. The hinged cover 60 may be opened by applying pressure to the tapered extensions 74 and 76 of the resilient fingers 64 and 66, respectively, such that they move toward one another after which they can be withdrawn through slots 68 and 70, respectively, to the open cover position.

Figure 3:
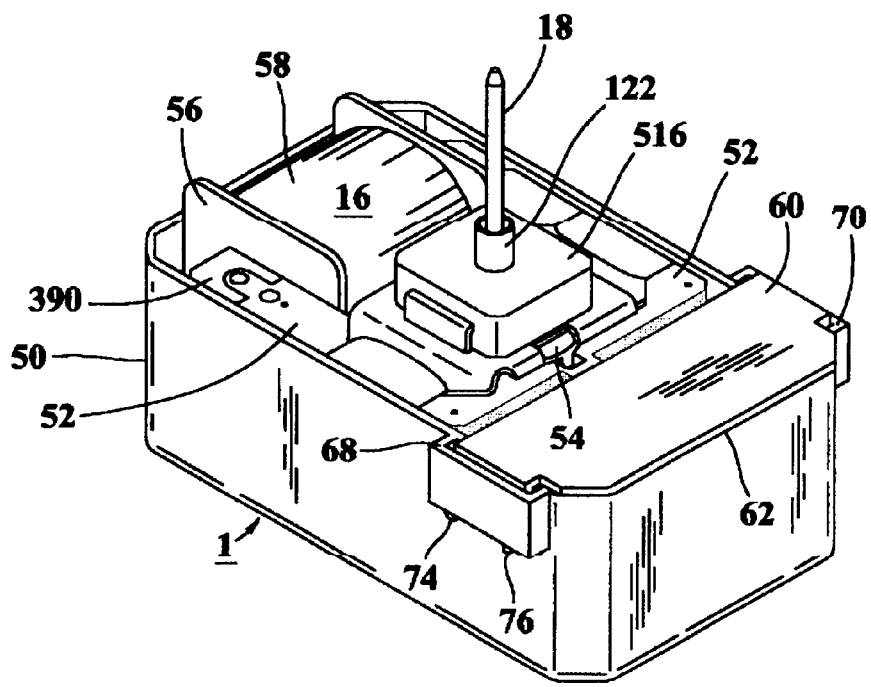
FIG. 3 is a perspective view of the integrated unitary evaporator fan motor and associated control circuit elements of FIG. 1.
Figure 4:
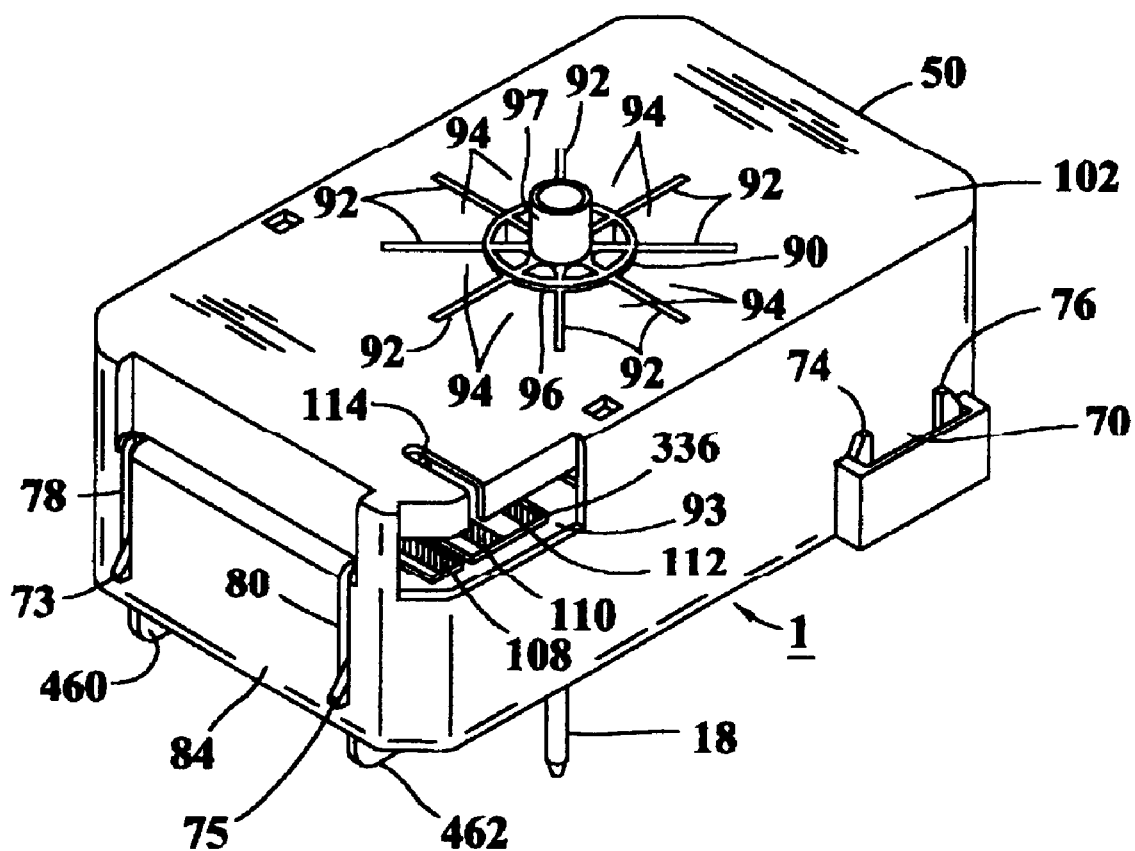
FIG. 4 is a rotated perspective view of the bottom of the package shown in FIG. 3.

FIG. 4 shows the bottom of the housing 50 which has been rotated from the position shown in FIG. 3 to better illustrate features of its construction. It is to be noted that the tapered extensions 73 and 75 molded integral with the bobbin 56 (also see FIG. 12) on which the windings of coil 58 are wound are shown positioned within slots 78 and 80 in the end of motor housing 50. When the integral motor and control circuit assembly 1 is pushed into the assembly cover 50 (also see FIGS. 16–18), the tapered surfaces of extensions 73 and 75 provide a camming action which initially deforms the end 84 of the resilient assembly cover outward, enabling the assembly to be inserted into the assembly cover until the extensions enter the slots 78 and 80. The resiliency of the deformed end section 84 of assembly cover 50 then causes the end section 84 to snap back to its original position and surround the camming extensions 73 and 75, locking the motor and control circuit assembly 1 within the cover, while at the same time assisting in properly positioning and securing the various elements of the assembly within the housing.

Figure 5:
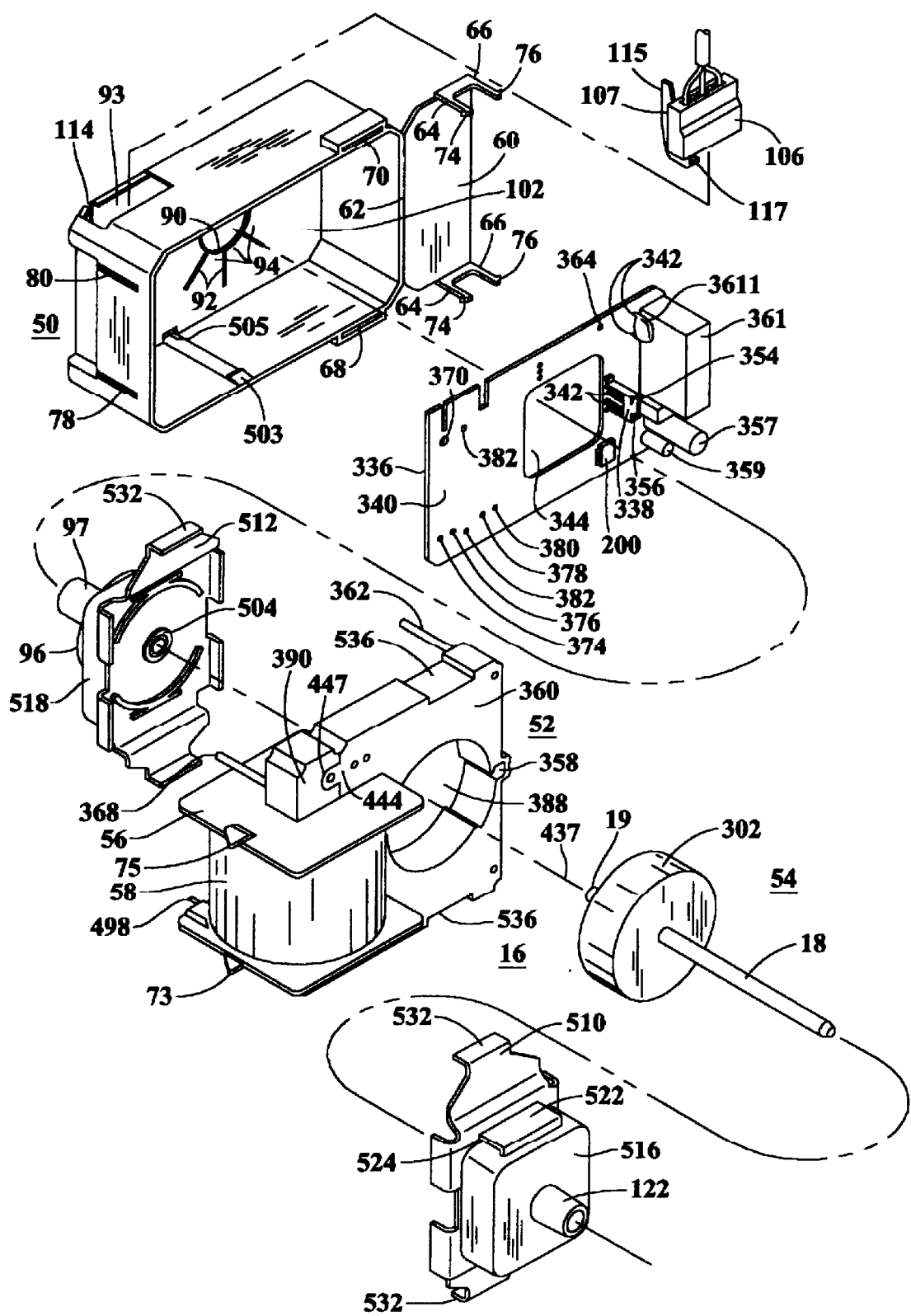
FIGS. 5 and 6 are exploded views of various major components of FIGS. 3 and 4.

Circuit board 336 (see FIG. 19) defines a substantially enclosed chamber 562 between the circuit board and the bottom 102 of the motor housing 50. As best shown in FIGS. 4 and 5, aperture 93 on the side of assembly cover 50 provides access, for the detachable edge connector power plug 106, to the circuit board traces 108, 110 and 112, formed as part of the circuit runs on board 336. Input power and grounding connections are provided to the assembly 1 through power plug 106. A slot 114 extending into the bottom 102 of housing 50 limits access to, and cooperates with, the resilient thumb release mechanism 107 of edge connector plug 106 to ensure that the plug can only be inserted with proper orientation. Slots 114 also assist in guiding the plug to ensure proper connection with and positioning with respect to board 336. The plug 106 is secured in place, in proper position, by depressing thumb piece 115 of the mechanism 107 while the plug 106 is being inserted. This rotates or pivots the mechanism to raise the cylindrical locking portion 117 until it clears aperture 370 in the board 336, whereupon the locking portion may move into, and be secured within, aperture 370 upon release of the thumb piece 115.

Note that the bottom 102 of housing 50 includes a circular opening 90 in the central region thereof (see FIGS. 4, 5 and 16–18), and eight radially extending slots 92 extend outward, away from the center or axis 437 of opening 90. This results in a leaved spring configuration molded integrally with the housing 50, that provides a plurality of resilient tapered fingers 94 formed between each adjacent pair of slots 92. The ends of fingers 94 are dimensioned and curved to receive, grasp, and position the cylindrical or tubular extension 96 of the oil well cover 518 of the motor, with extension 96 being molded integral with the oil well cover. The extension 97 is in alignment with, and opposite, a similar extension 122 (also see FIG. 19) on oil well cover 516 through which the shaft 18 passes. The extensions 97 and 122 on opposite ends of the rotor of the motor 16 constitute one way of mounting the assembly 1 within a refrigerator, and are positioned within cylindrical openings, or bearings (not shown), in a refrigerator to provide a two-point floating support which reduces evaporator fan motor vibration and noise within the refrigerator. This simple yet integral support system enables ready replacement of existing evaporator fan motors with motors illustrated herein for repair purposes, or for incorporation into existing refrigerator designs.

The assembly 1 has relatively few parts in order to minimize manufacturing costs, including the cost of materials and assembly, and in order to provide an inherent increase in reliability. The assembly is uncomplex, and utilizes multifunction structural elements which accurately position, support, and secure the mechanical and electronic components in operative relationship relative to each other.

The housing 50 supports and provides electrical isolation and insulation for electronic components mounted on both sides of the printed circuit board 336 (in the illustrated embodiment). These include (see FIG. 5) capacitor 361, Hall effect sensor 439 within Hall device holder 338, and other electronic components such as capacitor 357, capacitor 359, and IC 200 positioned on one side 340 of the board. Other electronic components such as power mosfet 560 (see FIG. 19) are positioned on the opposite side 341 of the board 336 along with the printed circuit interconnections or runs 499 (see FIG. 15A). The components are electrically isolated and insulated by being positioned in a chamber 562 defined by the board 336 and the bottom 102 of the housing 50. As will be understood, leads such as lead 342 of metal oxide varistor 3611 (see FIG. 19) extend from the electronic components through the board 336 and are connected in circuit with electronic circuitry and components supported on one or the other sides of the board.

It is to be noted that the electronic components such as the ASIC 200 and the Hall device are positioned on board 336 to one, or a first, side of the large aperture 344 in the central region of the printed circuit board. The rotor 54 of the evaporator fan motor 16 is positioned in the region of, and so that the rotor shaft passes through, aperture 344; while the stator coil 58 and coil bobbin 56 are positioned to the other, or a second, side of the aperture 344, remote from capacitor 361 and Hall device holder 338. This general layout and structure permits a two-point floating suspension of the rotor about axially extending tubular portions or noses 97 and 122 of the oil well covers. This arrangement also assists in providing a compact, integral assembly which fits within the space available in existing refrigerator designs for existing evaporator fan motors.

FIGS. 5, 10, 11, 19 and 20 show multifunction parts associated with the Hall sensor 439 for positioning, supporting, and connecting the Hall sensor in an operative interrelationship with both the motor and various control circuit components. The Hall device holder 338 is positioned on and secured to board 336 (see FIGS. 5 and 20) by means of a pair of tubular extensions 550 molded integral with the holder 338 and that pass through holes in the board. Hall device leads 342 are soldered into the circuit runs on the bottom or reverse side 341 of board 336 and help provide positive and secure positioning of the Hall device 439, while also establishing electrical connections with other components of the control circuit. As seen in FIG. 5, the shoulder 354 and extension 356, both molded integral with the holder 338, provide guidance, positioning or alignment, and support for the stator core 360 of the motor 16. When the stator 52 is assembled with the circuit board 336, the extension 356 extends into opening 358 in the stator core 360 until the shoulder 354 seats against the stator core, thus ensuring a positive and preselected operational magnetic coupling between the Hall sensor 439, a preselected region the stator core, and the rotor 54 operationally located in bore 388 of the stator core.

Figure 6:
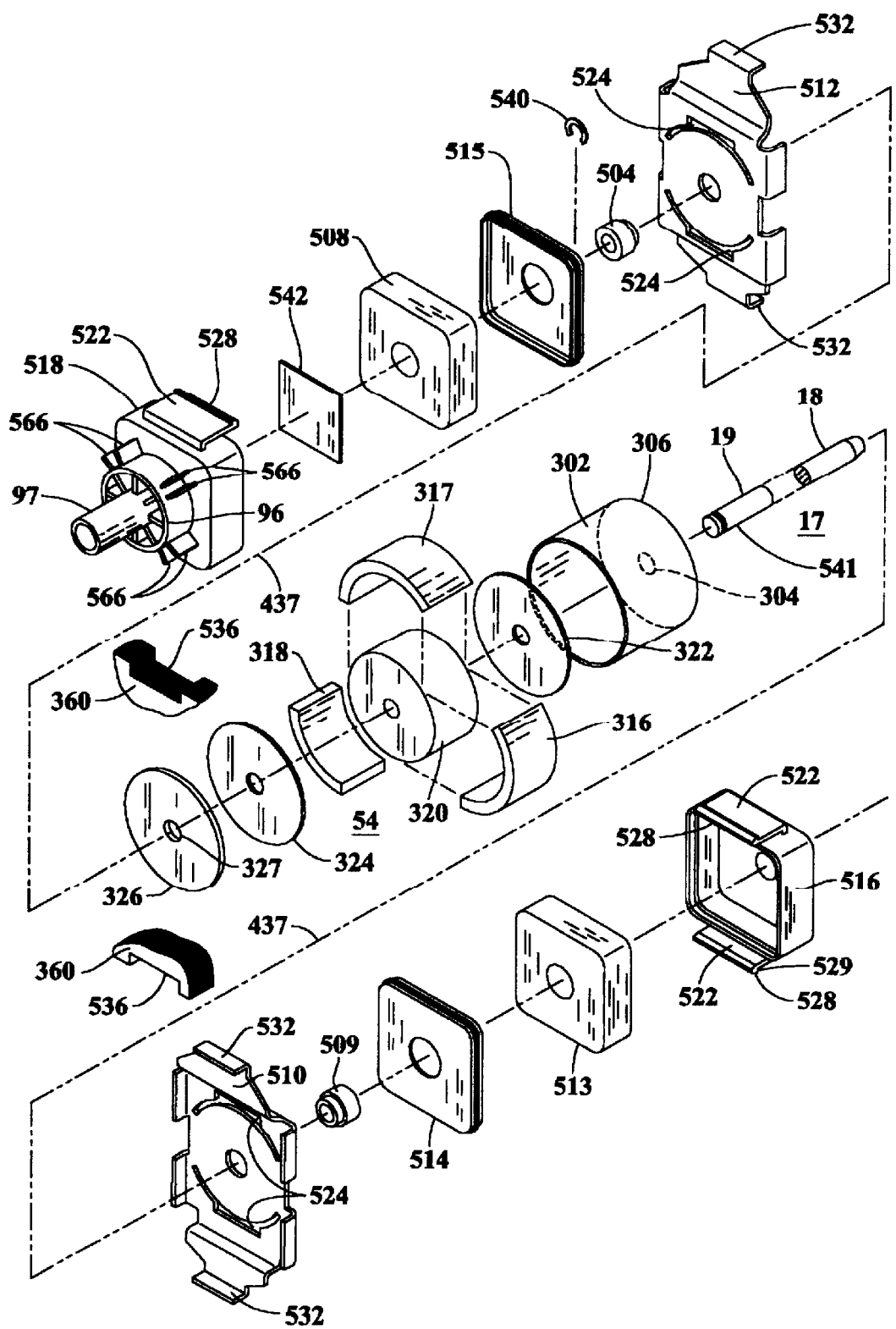
Figure 7:
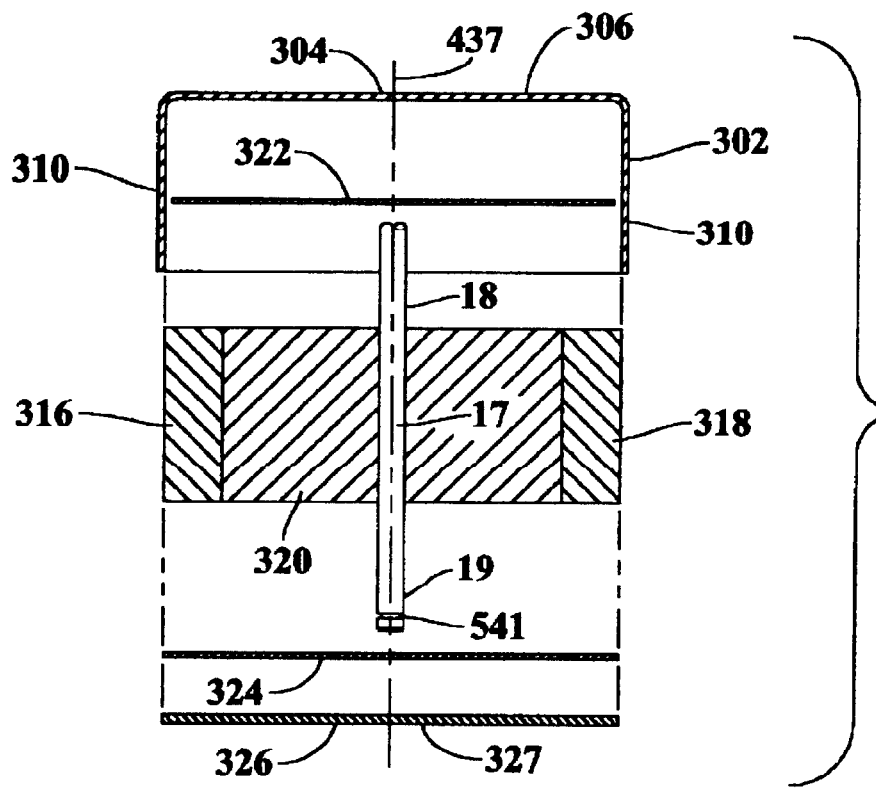
FIGS. 7 and 8 show the permanent magnet rotor assembly of FIGS. 5 and 6, with FIGS. 7 and 8 both drawn to a scale of about 1.90 times full size.
Figure 8:
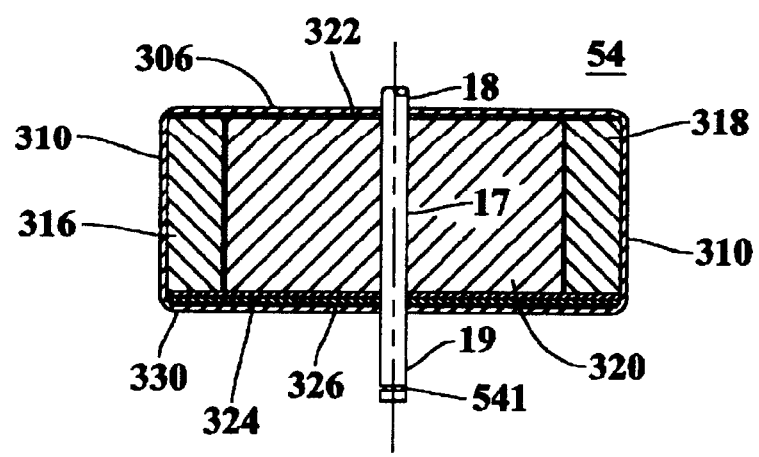

FIGS. 6–8 show details of the fabrication, structure and support of rotor 54. The currently preferred method of forming the permanent magnet rotor 54 represents a modification of the approaches described in U.S. Pat. No. 5,040,286 issued Aug. 20, 1991 to William H. Stark, assigned to the same assignee as the subject patent application, and the entire disclosure of which is incorporated herein by reference. More specifically, we presently utilize a deep drawn stainless steel cup "can" 302 which includes an essentially closed end 306 having a centrally located aperture 304 through which the PE (pulley end) of shaft 18 passes. The sidewall 310 of the cup 302 surrounds the magnets 316, 317, and 318; and the laminated iron or steel core 320 to which they are adhesively secured, with the circumferential magnets and magnetic core being sandwiched between Mylar® washers 322, 324. A stainless steel end washer 326 closes the open end of cup 302. In practice, and as revealed in FIG. 7, cup 302 is pressed over washer 322, circumferential magnets 316, 317 and 318, core 320, washer 324 and washer 326, in essentially the same manner taught in U.S. Pat. No. 5,040,286. The open end of cup 302 is rolled to provide a lip 330 (see FIG. 8) extending around the edge of washer 326 to permanently contain the parts shown in FIG. 8.

The cup 302 and washer 326 mechanically protects the ferrite magnets 316, 317 and 318 against chipping, defoliation, and adhesive joint failure. If any particles should separate from a main body of sintered high-density magnet material, the surrounding steel structure will contain such particles. The cup 302 is 6/1,000 of an inch (0.15 mm) thick. It also has been found to be advantageous to use a hot melt adhesive to fill the voids or gaps along the edges of the magnets 316, 317 and 318.

With reference to FIGS. 5 and 6, sintered porous bronze sleeve bearings 509, 504 support the shaft, and are supplied with oil from felt oil wicks 506 and 508 which are carried in chambers within the oil well covers 516, 518 which include oil well cover bases 514, 515 which snap into place so as to trap oil wicking material 506, 508 within the oil well covers. End shields 510, 512, in turn support the bearings and oil well covers. The oil well covers 516 include fingers 522 that snap in place in slots 524 in the end shields. Tapered portions 528 facilitate assembly, and ledges 529 prevent inadvertent disassembly of the oil well covers.

Figure 19:
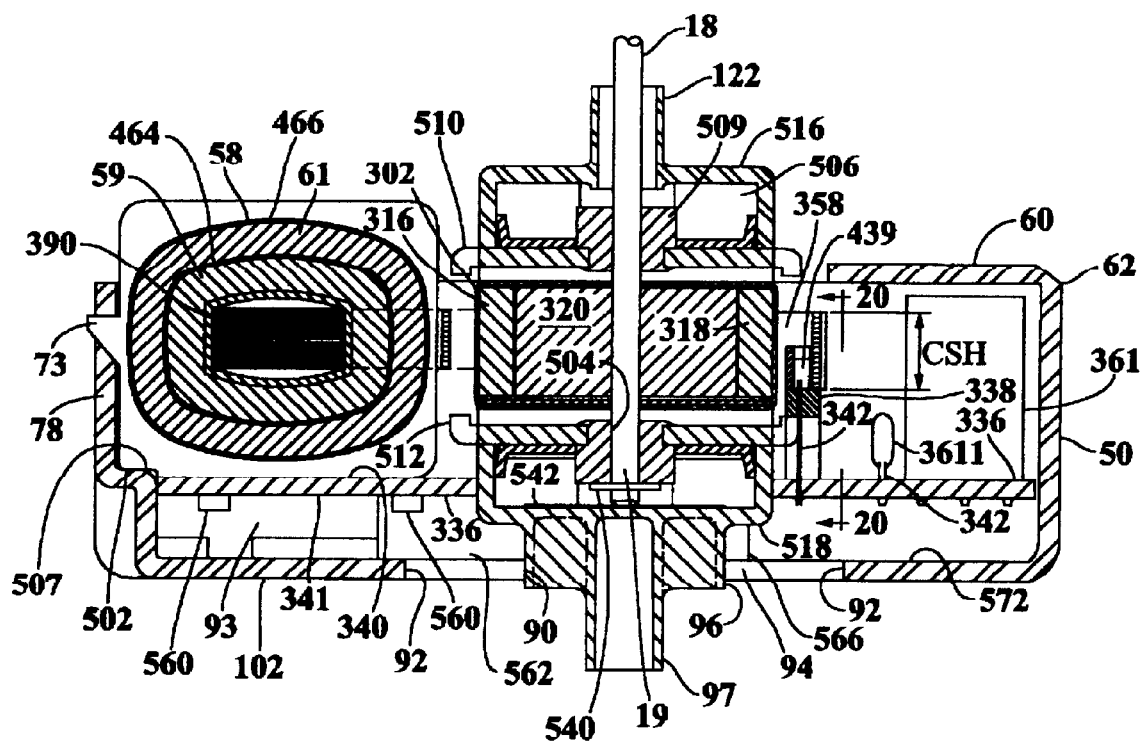
FIG. 19 is a cross-sectional view of FIG. 3 taken longitudinally through the axis of rotation of the motor, drawn to a scale of about 1.43 times full size, and showing details of the unitary motor assembly and control circuitry and circuit elements.
Figure 20:
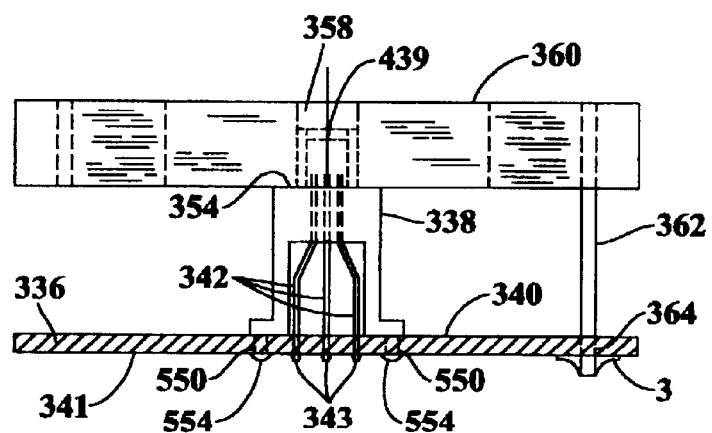
FIG. 20 is a much enlarged cross section taken through the center of the Hall sensor showing details of the positioning and mounting of the Hall sensor of FIGS. 5 and 19.

As best shown in FIGS. 6 and 19, a conventional snap ring 540 snapped into a groove 541 on the shaft limits axial movement or end play of the rotor 54 in one direction. An end play bearing or thrust washer 542 limits rotor end play in the other direction. The end shields 510 and 512 also include tabs 532 (best shown in FIG. 6) which interfit with notches 536 (see FIG. 5) on the core 360, and are held in place by an epoxy adhesive.

FIGS. 4, 6 and 19 also illustrate some of the multifunctional positioning and support aspects of the OPE oil well cover 518. Referring to FIG. 6, spacer ribs 566 (molded integral with the cover) extend radially outwardly to provide a spacing, or stand-off function with respect to the bottom wall of housing 50 (as seen in FIG. 19), and determine the spacing of the subassembly above bottom 572 of assembly cover 50 to form the chamber 562 for the electronic components.

Figure 9:
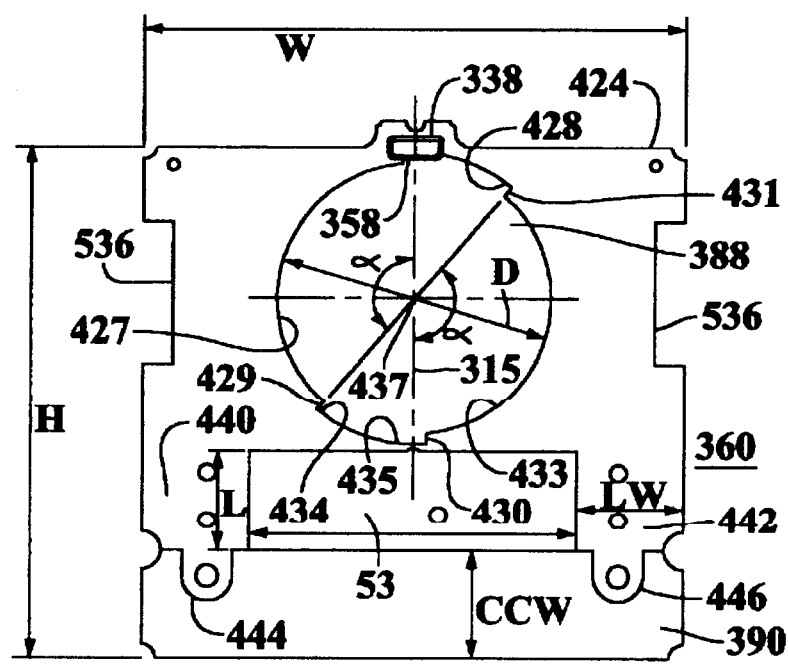
FIG. 9 shows details of the stator construction of the motor of FIG. 5, drawn to a scale of about 1.29 time full size.

Referring to FIGS. 5 and 9–11, core 360 and conventional interlocked laminations 424 are stacked together to form a preselected stack or core height. Each lamination includes a central opening that forms a rotor accommodating bore 388. As best shown in FIG. 9, we provide diametrically opposed arcuate portions 427 and 433 having a diameter of about 1.32 inches (33.5 mm). The portions 427, 433 have an arcuate extent, alpha, between steps 431, 429 and vertical axis 315 of about 130 to 140 degrees. In what we presently believe to be our best mode, the angle alpha is 140°. We also provide diametrically opposed bore defining stepped portions 428, 434 with a diameter of about 1.42 inches (36.1 mm) that extend from steps 429 and 431 toward axis 315. However, in the vicinity of gap 358, region 428 ends at such gap; and in the vicinity of step 430, region 434 becomes a straight line for a distance F (see FIG. 11) of about 0.244 of an inch (6.2 mm). Thus, the depth of the steps 429, 431 is about 0.050 of an inch (1.27 mm). The span, theta, for these steps is 40° to 50°, and preferably 40°. The flat portion of the bore (see distance F in FIG. 9) provides an anomoly in the flux path at one end of axis 315 that is believed to reflect or balance the anomoly in the flux path caused by gap 358 at the other end of axis 315. The details of the bore design presented herein are believed to significantly enhance the starting torque or starting ability of motor 16.

Our inventions are embodied, in the motor 16, in a relatively small C-Frame or "skeleton" motor having dimensions, as shown in FIG. 9, such that: the round bore diameter D was about 1.32 inches (33.53 mm); the overall width W of a lamination was about 2.5 inches (63.5 mm); the height H was about 1.98 inches (50.3 mm); the winding window opening width O was about 1.44 inches (36.6 mm); the winding window height L was about 0.51 inches (12.9 mm); the leg width LW was about 0.53 inches (13.5 mm); and the coil core width CCW was also about 0.53 inches (13.5 mm). The core stack height CSH (see FIG. 19) was varied, to produce motors of different power output capabilities, and in the case of a 3.8 watt input/2.6 watt output motor CSH was about 0.3 of an inch (7.62 mm), while in the case of a 5.5 watt input/4.0 watt output motor, CSH was about 0.5 of an inch (12.7 mm). Thus, relatively small C-Frame motors of the type illustrated herein are producible having actual efficiencies of 68% to 73% for core stack heights of 0.3 and 0.5, respectively. This compares with prior art C-Frame motors of similar physical size (with roughly similar contents of lamination iron and copper wire content and that are commonly known as KSP, or shaded pole AC induction motors) with, efficiencies of about 30%. For completeness of disclosure, it is noted that the just described 0.3 and 0.5 inch stack motors were made of laminations stamped from lamination grade silicon steel; and that the coil wire size, turn count, and size of capacitor in different cases were as shown in Table I hereinbelow.

Payback from improving efficiencies for motors mounted inside refrigerated spaces is enormous. For example, a current refrigerator uses a KSP motor that requires input of 13.5 watts, most of which is converted to heat. Motor type 3 listed in Table I can be interchanged for such KSP motor and do the same air circulation work yet require only 5.5 watts of input power (8 watts less input). In the particular refrigerator being discussed the savings leverage factor is about 2.2 (considering the compressor and condenser). Thus, a total system power savings of (8+1.2×8) or 17.6 watts is realized. In other words, the air moving work of the old motor is performed while the actual energy consumed by the system is actually reduced by an amount greater than the total power input of the old motor.

TABLE I

| Motor Number | 1 | 2 | 3 |
|---|---|---|---|
| Data Determined By: | Calculation | Test | Test |
| Core Stack Height | | | |
| (inches) | 0.3 | 0.3 | 0.5 |
| (mm) | 7.62 | 7.62 | 12.7 |
| # Of Wire Turns Per Coil | 2300 | 2300 | 1950 |
| Total # Of Wire Turns | 4600 | 4600 | 3900 |
| Bare Wire Size, AWG. | 32 | 32 | 31 |
| Bare Wire Diameter, | | | |
| (inches) | 0.008 | 0.008 | 0.0089 |
| (mm) | 0.203 | 0.203 | 0.226 |
| Size Of Series Capacitor 127 In Microfarads | 2.1 | 3.4 | 3.7 |
| RPM At Load Point, rpm | 2850 | 2850 | 3250 |
| Torque At Load Point, oz-in | 1.05 | 1.25 | 1.65 |
| Watts Output | 2.2 | 2.6 | 4.0 |
| Watts Input | 3.25 | 3.8 | 5.5 |
| Efficiency | 68% | 68% | 73% |

The data of Table I above clearly shows (compare the data for motors 1 and 2) how a change in the value of capacitor 127 can be used to change the power input and torque output. Thus, our motor and circuit is such that a motor-control designer now can tailor the output of a motor by simply changing a control circuit capacitor. A comparison of the data for motors 2 and 3, on the other hand, reflects how both greater power output and speed changes can be accomplished by changing the core stack height, the number of coil turns and wire size, and the size of a control circuit capacitor. Thus, motor-controls made pursuant to our teachings may be readily modified, in a simple and straight forward manner, to obtain a range of desired operating characteristics.

The above described bore configuration is an important factor in providing improvements in starting capabilities, and it can be generally characterized as one wherein a first flux path anomoly is located at a preselected location on one side of the bore as a consequence of accommodating a position sensing device (e.g., openings or pocket 358 for device 439); a second flux path anomoly is located about 180° away from the first anomoly (e.g., a flat region 435); and regions of limited span that represent basic bore dimension discontinuities (e.g., steps) to assist in starting without unduly degrading efficiency.

Figure 10:
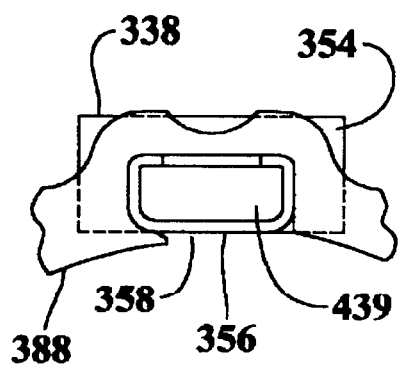
FIG. 10 is an enlarged fragmentary drawing of a portion of FIG. 10 showing the placement and retention of a Hall device sensor within the stator, drawn to a scale of about 4.63 times full size.

With reference to FIGS. 9 and 10, the pocket or chamber 358 is of generally rectangular shape, with a taper partially closing the inner end adjacent the bore 388, and the chamber extends through the core, parallel to axis of rotation 437.

An open region 53, defined by lamination legs 440 and 442 is provided to accommodate the excitation windings in the stator coil 58 (also see FIG. 5). Lamination leg ends 444 and 446 mate with matching concave openings 447 in the coil core 390 (see FIG. 13).

Referring next to FIGS. 12–15, coil bobbin 56 includes a central section 450 having walls 452, 454 that define a coil core accommodating passage 456. Any suitable bobbin material may be used, and in our reductions to practice, we have used Dupont's material known as Rynite 415HP, which is readily moldable and provides good electrical and mechanical properties. Integrally molded bobbin end plates 460, 462 retain the wound coil in place, and also establish connector locations. Also molded integrally, as part of the bobbin 56, are locating anchors 384, 368 which help secure together the motor and circuit board 336. Also molded as part of the bobbin 56 are camming fasteners 73, 75. Tapered camming extensions 74, 76, assist in positioning the assembled motor and control board, within the housing 50 as described hereinabove.

Figure 13:
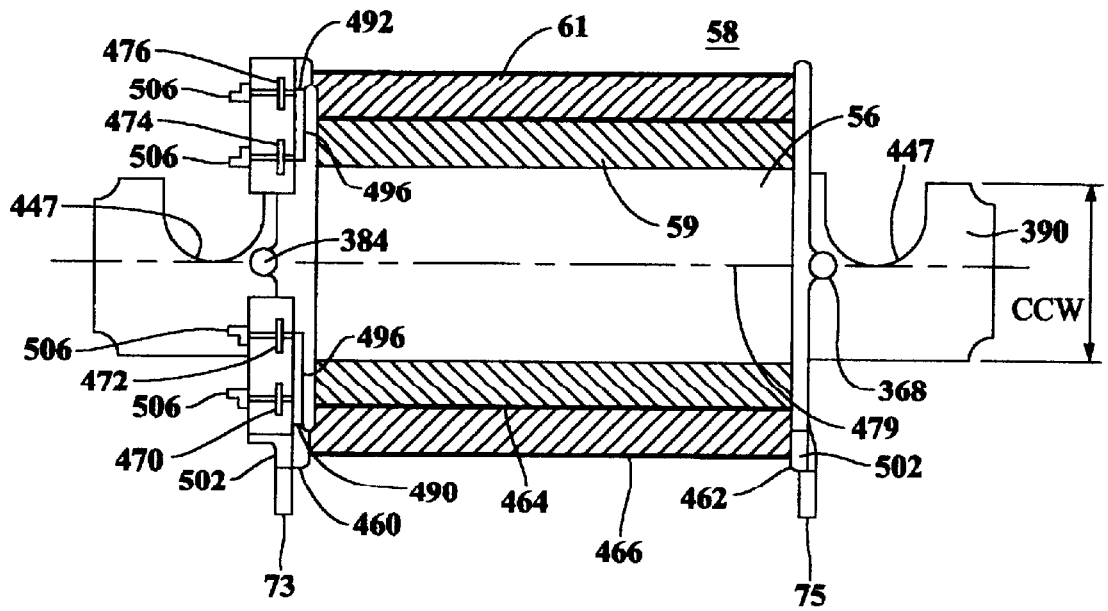
FIG. 13 shows details of the coil windings on the coil bobbin of FIG. 12, all drawn to a scale of about 1.83 times full size.
Figure 14:
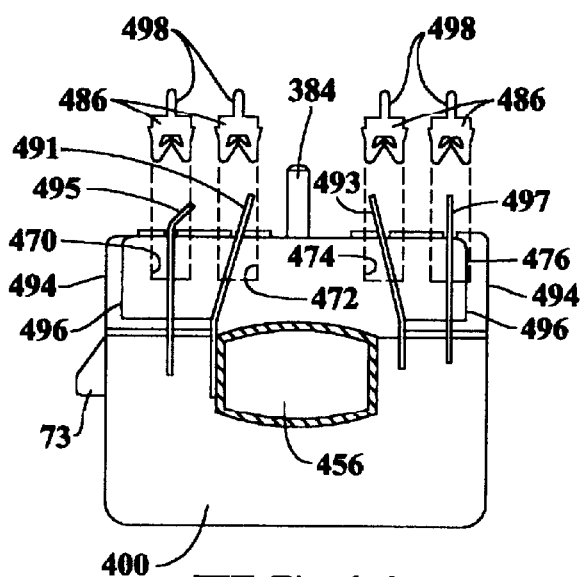
FIG. 14 and enlarged fragmentary

As shown in FIGS. 13–15, windings 59, 61 of coil 58 are layer wound separately. The use of two separate windings simplifies the switching circuitry used to establish the desired direction of current flow through the windings as the north and south poles of permanent magnet rotor 54 approach, and then move away from, a given region of the stator 52. It is not necessary to switch direction of current flow through the windings, since switching energization from winding 59 to winding 59 (and vice versa) switches the polarity of the magnetization as required without complex switching circuitry. While conventional wisdom might indicate that a bifilar winding would be preferred to two separate windings, extensive testing has suggested that to do so would increase the risk of phase-to-phase shorting of bifilar wound windings, and particularly under high humidity conditions. Thus, a layer winding approach is preferable for refrigeration applications. Winding 59 is separated from winding 61 by a single wrap of 3M, #1 Dysular tape; and this same tape or a fiberglass tape is then wrapped around the outside of the winding as shown at 61.

Slotted pockets or receptacles 470, 472, 474 and 476 include perpendicular slots 480, 482, 484 and 486. This divides each slotted pocket 470, 472, 474 and 476 into a separated pair of jaws with adequate resiliency and flexibility to enable the forced insertion and retention of an electrical terminal 486 into each of the slotted pockets. To facilitate the positioning and retention of terminals, the terminals each include jaws 488, 490 and, upon forced insertion of the terminals, a camming action between the tapered jaws and slotted receptacles results in an interference fit therebetween.

Passageways 490, 492 assist in guiding, positioning, and protecting winding ends 59, 61, which lie along the passageways, lie across the slotted pockets 470, 472, 474, and 476, and are wrapped around an adjacent post 506 (see FIG. 13). Thus, when terminals 486 are inserted into the pockets, the sharp inner opposed edges of jaws 488 and 490 pierce the insulation on the magnet wire ends so as to provide a good electrical connection between the magnet wire and the terminal.

Figure 15A:
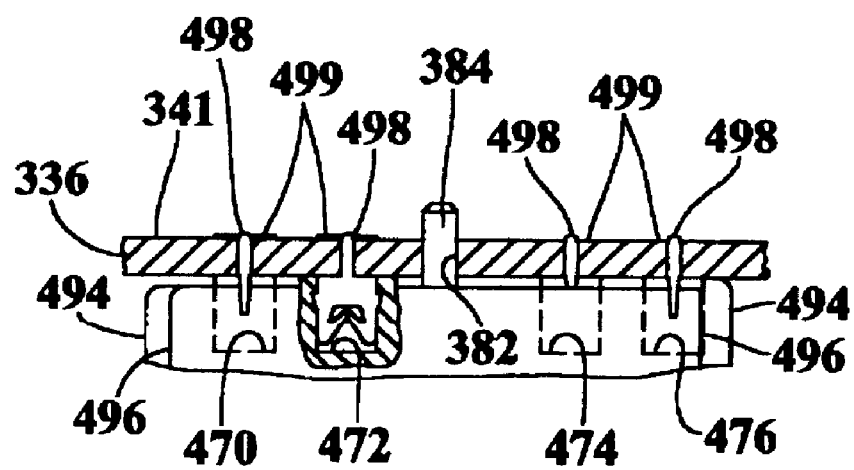
FIGS. 15A and 15B show details of ends of the coil windings (of FIG. 13) fastened to terminals, and the securing of terminals and windings directly to the conductive runs of a circuit board.
Figure 15B:
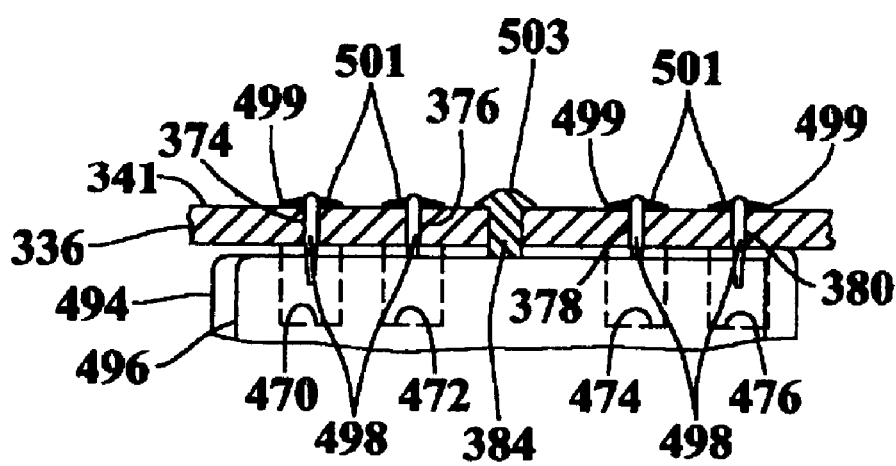

The projections 498 of terminals 486 become connection points with the circuit board. Thus, the terminal tips 498 pass through holes 374, 376, 378, 380 in board 336 and also through holes in runs 499 on the opposite side of the board. FIG. 15B shows solder connections 501 between tips 498 and conductor runs 499. In addition to providing electrical connections, this technique mechanically secures the terminals and thus bobbin 56 and the rest of the motor to board 336. FIGS. 15A and 15B also show how the posts 384 are headed over to provide further mechanical integrity for the assembly.

It is again emphasized that various components of the assembly disclosed herein include multifunctional means that, e.g., position, connect, and/or support various components in operative relationship relative to one another. For example, the Hall device holder 338 (see FIGS. 5, 9 and 20) holds the Hall device in a desired operative relation with the stator core, is mechanically locked to the circuit board, and also mechanically stabilizes the position of the stator. The Hall device not only helps anchor holder 338 to the board, but also senses rotor position (and rotation) as described in detail below.

Figure 11:
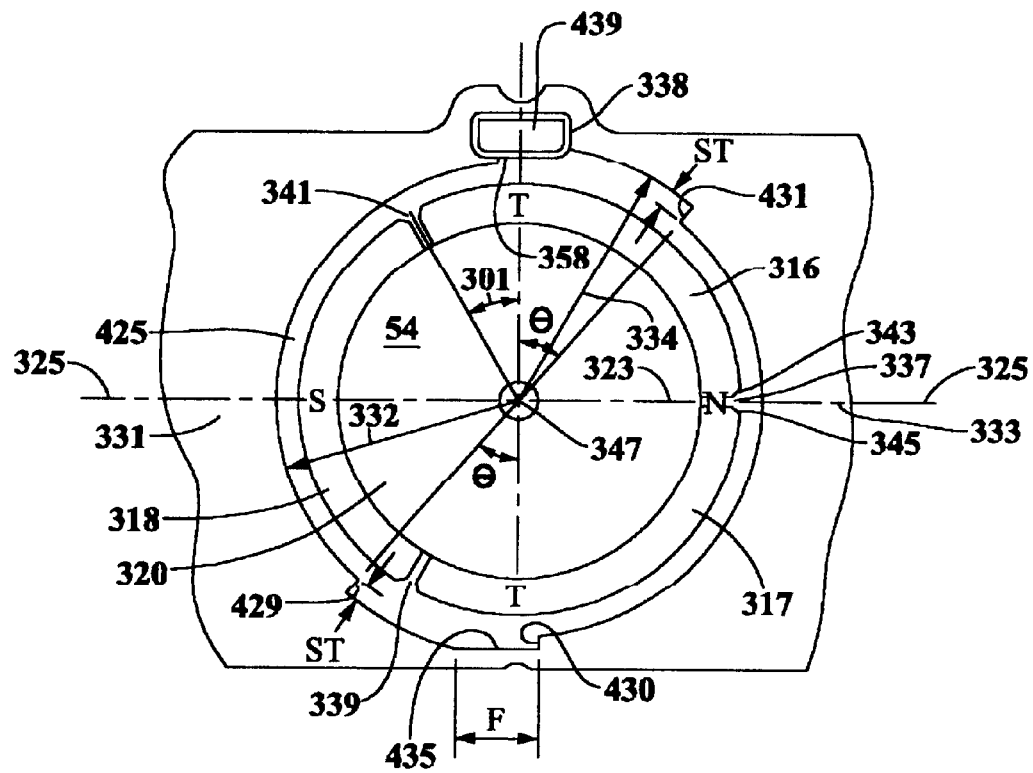
FIG. 11 is a fragmentary drawing of portions of the DC brushless motor of FIGS. 3–9 showing the stator bore configuration and polarization of the permanent magnet rotor, and is drawn to a scale of about 2.12 times full size.

Further details of a preferred permanent magnet rotor configuration are shown in FIGS. 6 and 11. The rotor 54 includes a cylindrical magnetic core 319, that is of conventional laminated construction, surrounded by three circumferentially extending arcuate ferrite magnet segments 316, 317, 318, each of which theoretically spans 120°, but actually spans approximately 118 degrees (approximately one-third of the rotor core surface) since allowances must be made for manufacturing tolerances, variations in part sizes, and so forth. Ideally, one continuous cylindrical magnet should be used, but such a construction would not be practical because of: wide dimensional tolerances that are inherent in ceramic materials such as ferrite magnets; the brittle and easily damaged character of ceramic materials; assembly and manufacturing difficulties that would be presented, and so forth. It is believed that these also are reasons to not make the permanent magnet part of the rotor from only two magnet pieces. Moreover, we have discovered that, for a two-pole motor, three magnets should optimally be provided, but magnetized into a two-pole configuration to form a rotor having only one north and one south polar region centered on the axis 323 of rotor 54. The left and right portions 331, 332 of the stator core constitute magnetic poles, centered on the stator polar axis 325, that are supplied with magnetic flux from the coil core 390, and these portions alternately become excited north and south magnetic poles. Also, and as will be understood by persons skilled in the art, Hall device 439 senses changes in polarity of the rotor as the rotor magnets rotate past the device 4391. As the transition region, T, between north and south rotor poles passes the Hall device, the device provides a signal used for switching power to the windings carried by the coil core 390, thereby to switch the polarity of the stator poles.

The provision of three magnet segments (for a two-pole rotor) and the magnetization of the rotor as shown in FIG. 11 is, we believe, of substantial significance for reliable operation of motor 16. It is known that the Hall device will provide a signal as the regions T move therepast. It also is believed that the slower the rotor 54 is moving (e.g., when first starting), the more important it is that the signal from the Hall device be "clean" and be accurate in sensing the position of the rotor. Also, we have found that "cleaner" signals and more reliable starting will occur when the transition region T between rotor magnetic poles is positioned at least thirty degrees (30°) from the magnet void or gap 337, 339, or 341 closest thereto. The use of three rotor magnets, with the north-south pole transitions T located about 30° from a void between adjacent magnets provides a readily manufacturable rotor that also yields reliable starting performance.

In the particular arrangement of rotor 54 it will be noted that the above criteria will result in the center of either the north or south rotor poles being located at or very close to one of the gaps. However, this does not result in any difficulties known to us. Application of the above described principles (including the loction of regions T 30° from an adjacent gap) for a two-pole rotor ECM relying on a single position sensing Hall device will reveal that optimized starting performance will be obtainable only with magnets that span 360°, 180°, 120°, or 90°, and thus, such rotors should utilize one, two, three, or four magnets (assuming manufacturability considerations are not of overriding importance). It thus will be understood that our teachings are that the number of magnets used, and therefore the mechanical angular span thereof, should be selected and the location of magnetic poles should be selected so that the polar transistor locations (or magnetic nulls) T, will be angularly located thirty degrees from gaps between adjacent magnetic elements. For completeness of disclosure, we note that the magnet material we used in motor 16 were 0.165 inch (4.19 mm) premolded thick ferrite type S3547 purchased from Stackpole Carbon Co., and that the material purchased was characterized as having a BR value of 3220 gauss and an HCI value of 4850 oersteds.

While on the subject of the rotor magnets, we have also determined that the density of the magnetic ceramic material appears to be of extraordinary importance in motor applications where the magnets are exposed to both moisture and freezing temperatures. We have determined that the material used should be sufficiently dense, or non-porous, that the magnets do not crumble and break because of moisture freezing therein. It is presently believed that the ferrite material described above should have low porosity, equivalent to that associated with a density of at least about 4.8 grams per cubic centimeter.

With continued reference to FIG. 11, we have found that the starting performance of motor 16 is sensitive to the reluctance torque of the motor which in turn is affected by the size and location of the reluctance steps in the bore. With respect to starting torque problems, the transition T between north and south rotor poles has a larger affect on reluctance torque (and thus starting torque) than the gaps between the magnet segments 316, 317, and 318; and the reaction of this transition magnetic region to the stator gaps 337, 339, 341 and steps 429, 430, 431 creates a major portion of the reluctance torque. A number of published works describe the phenomena of reluctance torque, one of them being the book titled *Permanent-Magnet and Brushless DC Motors* by T. Kenjo and S. Nagamori, published by Oxford University Press, Walton Street, Oxford OX2 6DP, having a copyright date of 1985, the contents of which are incorporated herein by reference for background purposes. We utilize this phenomena, and distort the air gap (with steps) so that it is not a uniform air gap around the full circumference of the bore.

We have found that improved starting performance of motor 16 results when the depth of steps 431 and 439 are from 0.025" to 0.050" (0.63 to 1.27 mm), and preferably 1.27 mm; and when the arcuate spans theta are from 40° to 50°, and preferably 40°. To give a general idea of the improvements in starting torque that may be attained when following the teachings presented herein, we have found that motors like motor 16 having steps of about 1.27 mm and an arcuate extent of 40° have from two to four times as much locked rotor torque as that available from similarly sized, shaded pole, C-frame, AC induction motors.

It should now be understood that we have found that undesirable reluctance torque sensitivity and potential starting performance and torque problems can be avoided and be made relatively independent of the location of transition regions T relative to device 439 when the rotor 54 is at rest.

While we have built satisfactory rotors, for use with motors embodying the present invention, having more than three arcuate circumferential permanent magnets (e.g., with 6 magnets), three (3) arcuate magnets is our preferred alternative, based on economic considerations. Also for the purpose of making a full and complete disclosure, it is noted that the physical gaps 337, 339 and 341, are shown exaggerated in FIG. 11, and that the magnets have chamfered or beveled corners (see 343, 345), as shown, at their edges remote from axis of rotation 347 to facilitate fabrication of rotor 300, and to minimize magnet chipping or breakage in the region of the gaps during rotor fabrication.

Because of the stepped stator bore 425 of the stator, when the motor is started (i.e., first energized) a magnetic field is established about the bore such that there are magnetic flux differences about the bore, which assists in initiating rotation of the rotor. Once the rotor starts turning, the device 439 senses rotor rotation and controls commutation of the windings 59 and 61 in a manner to establish a rotating magnetic field (in the stator), and operation of the motor as described in detail below and in the aforesaid U.S. patent application Ser. Nos. 07/661,807 and 07/661,818.

A grounding pin 362 (see FIGS. 5 and 20) is staked to the stator core 360 and upon positioning of the evaporator fan motor on circuit board 336, pin 362 passes through circuit board hole 364. The pin contacts and is soldered to ground lead 3 on the board. Other elements that support and anchor the motor to the board are molded, molded bobbin supports 368, 384 (previously discussed), and the electrical contact pins or projections 498, previously discussed, which are connected to the winding coil leads.

Thus, the motor and control circuit are mutually interdependently positioned, supported, secured, and electrically connected through a plurality of cooperating members. Also, the Hall device, mounted on the circuit board, is precisely located in operative relationship within the stator core; and magnetically coupled to the rotor flux while being contained within a stator core pocket. It should be particularly noted that no nuts or bolts are required for the assembly illustrated herein.

Figure 17:
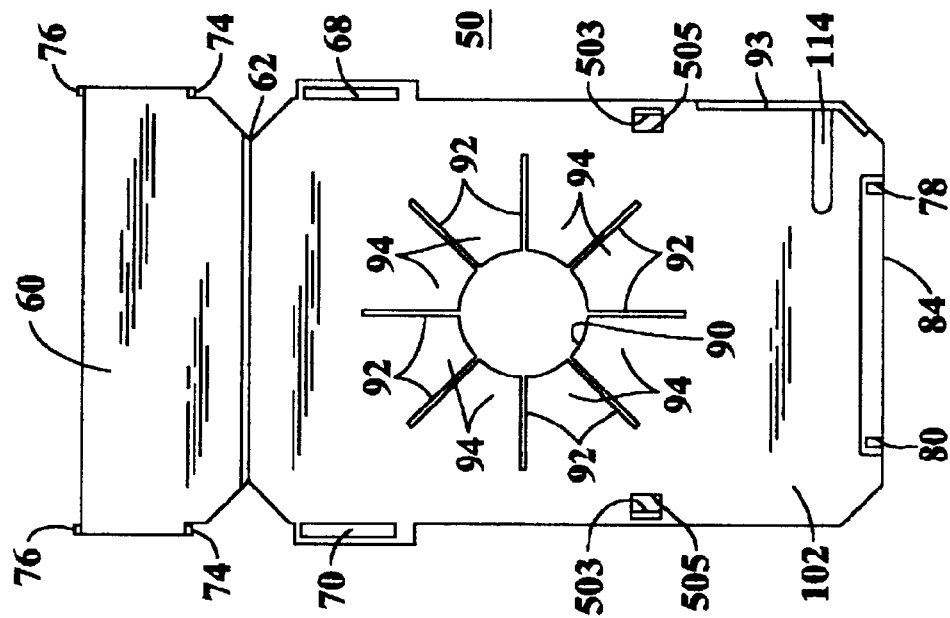
FIGS. 16, 17 and 18 show details of the integral mounting and positioning means on the assembly cover, with FIG. 18 being a cross section of FIG. 16 along the line 18, 18.
Figure 16:
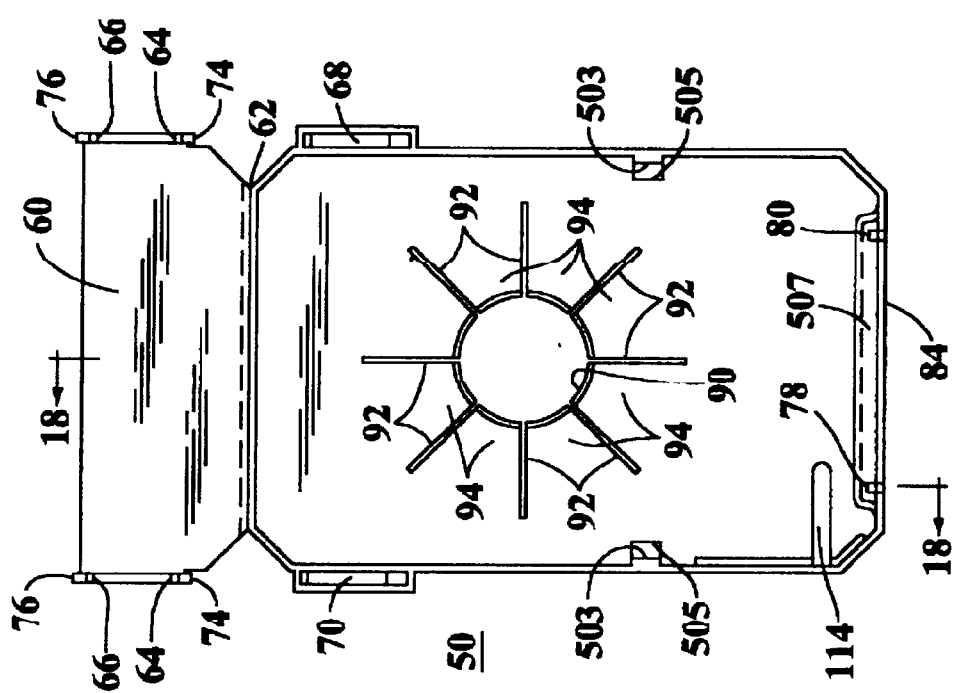
Figure 18:
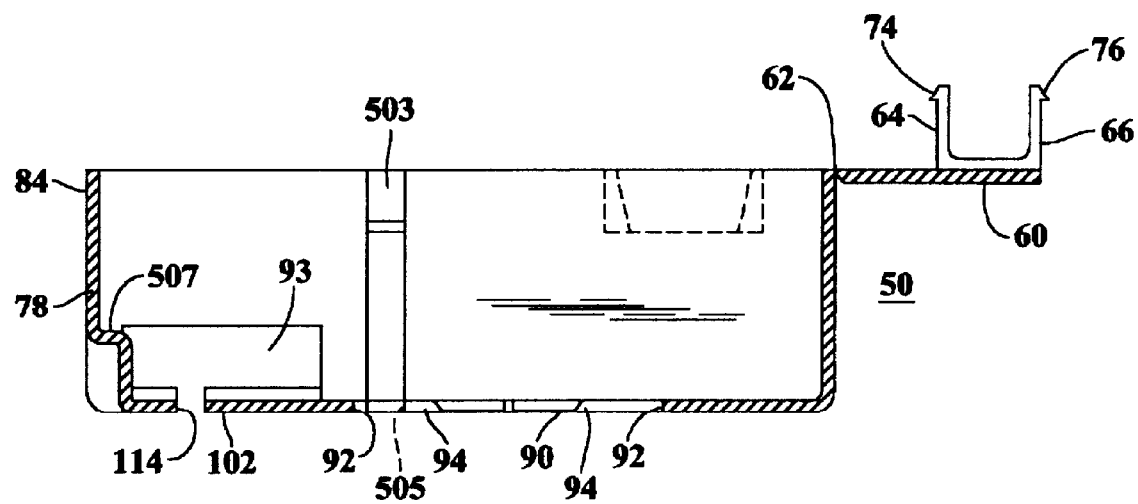

FIGS. 4, 5 and 16–19 show features of the housing 50 that further assist in the positioning, securing, and insulation of the motor and control circuit 1. Referring first to FIGS. 18 and 17, note that a pair of tapered positioning ribs 503 are formed integral with the housing 50. The positioning ribs 503 taper toward the central region of the assembly cover 50 and may be molded to the desired final shape or molded and then shaped or formed by an upset tool passing through access holes 505 also molded in the bottom of the cover. When the motor and control assembly is inserted into the housing 50, the positioning ribs 503 contact the sides of the stator core 360 (see FIGS. 5 and 19) and guide the assembly into a desired predetermined centralized position where it is spaced from the sides of cover 50. The ribs also prevent the motor, after being secured in the housing 50, from subsequent undesired lateral movement.

Figure 12:
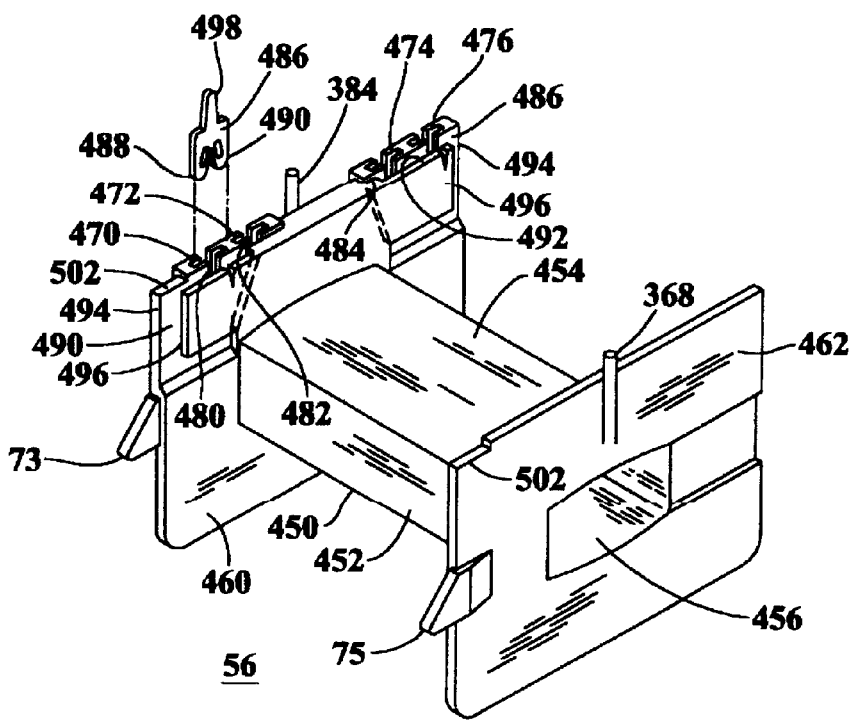
FIG. 12 is an enlarged view which shows details of the multifunction coil bobbin part of the motor of FIG. 5.

The ledges or shelves 507 (best shown in FIGS. 18 and 19) near the bottom 102 of the housing 50 provide positioning and support means for the mating corner notches 502 molded integrally in the bobbin 56 (see FIGS. 12 and 19). The housing 50 also assists in positioning and securing the motor and control by means of mating slots 78, 80; and tapered camming fasteners 73, 75 as described above.

Figure 21:
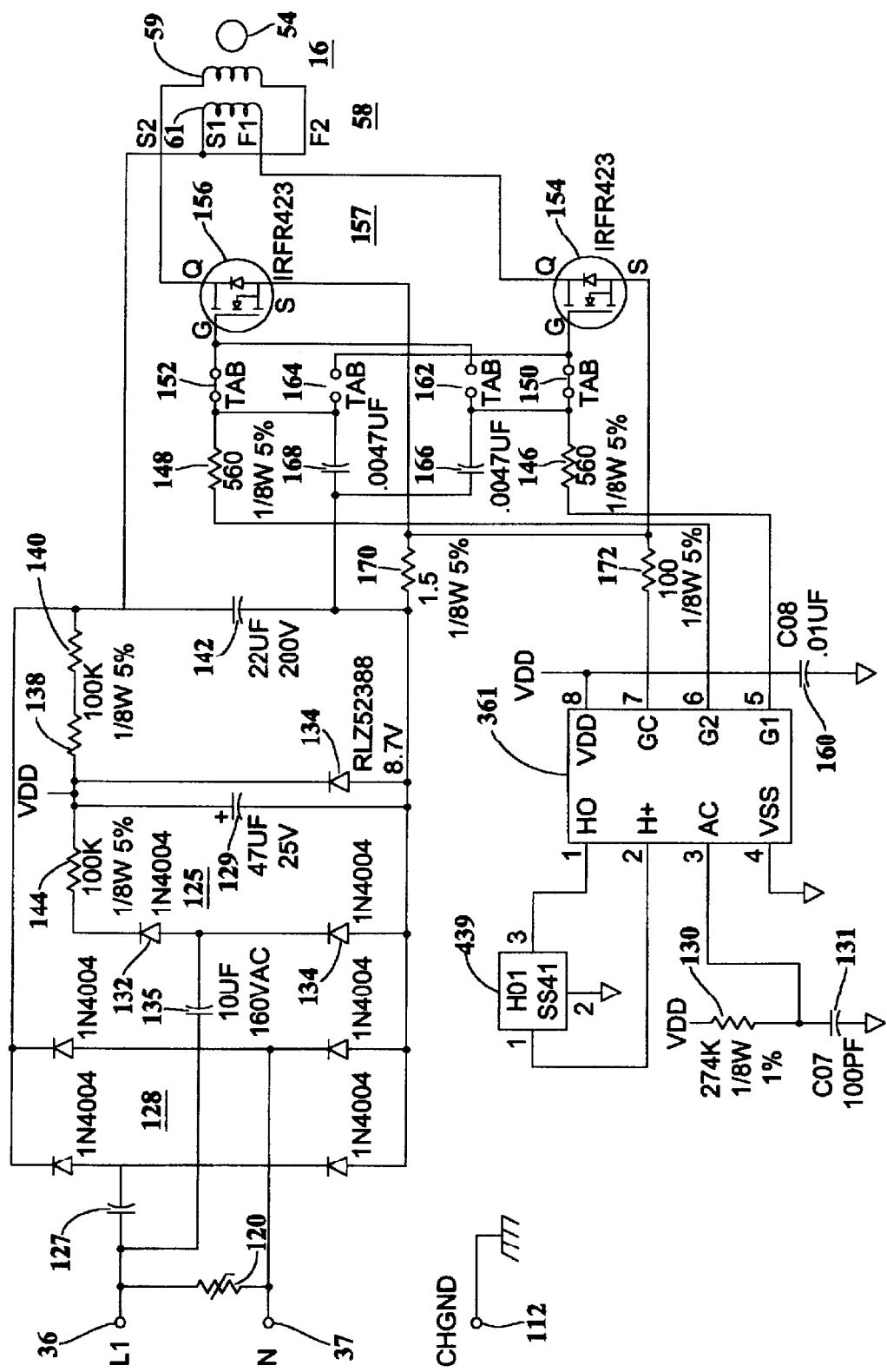
FIG. 21 is a schematic of the solid state circuitry associated with the Hall sensor and motor field coils, portions of which are shown on FIGS. 4, 5, 15A, 15B, 19 and 20.

FIG. 21 shows pulsing, sampling, control, and protective circuits utilized with the Hall device 439. Capacitor 135 provides a series capacitance which acts as an impedance to drop the voltage from the high-voltage bridge rectifier 128 (which is part of the power supply that powers the stator windings 59 and 61 as described below) to provide a lower operating voltage for the ASIC 200 semiconductor integrated circuit, associated electronic circuits, and the Hall sensor 439. The low-voltage electronic power supply 125 (which receives its power through capacitor 135) includes diodes 132 and 134 and provides low-voltage rectified DC power. The low-voltage power supply 125 also includes filter capacitor 129, across diodes 132, 134, which smooths the DC output voltage, and helps absorb line transients and transients generated by switching circuits described below. A voltage regulator 136 in parallel with filter capacitor 129 provides a regulated voltage of approximately 8.7 volts to the electronic circuitry. A MOV (metal oxide varistor) 120 is positioned across the input lines 36, 37 to provide transient protection for the circuit. As will be understood, MOV 120 will exhibit high resistance at low voltage (e.g., 120V), and low resistance at high voltages.

Resistors 138 and 140 are also part of the low-voltage power supply 125 and are connected between capacitor 142 (the high- voltage filter capacitor) and capacitor 129 (the low-voltage filter capacitor) to bleed current into the low-voltage power supply 125. Bleeding of current is required in the event the motor windings 59 and 61 of the evaporator fan motor 16 are unenergized, or become deenergized. Under such conditions, if there were no bleed circuit, no current would be drawn from capacitor 142, and this condition would result in a voltage doubling circuit between capacitor 135 and capacitor 142 (in which the voltage on capacitor 142 would go to twice the peak of the voltage between lines 36, 37, while at the same time current to capacitor 135 would be reduced). This could result in insufficient current to supply the electronics and ASIC 200, which could render inoperative the control circuit, including the protective current limiting and timed motor start and restart operations. Accordingly, resistors 138 and 140 are provided to bleed current through the capacitors 129 and 142 so that the voltage on capacitor 142 cannot become excessive, and the power to the control circuits insufficient.

The current bled requires only a small amount of power because resistors 138 and 140 are large. Also, since the capacitor 135 current is decreasing as the voltage on capacitor 142 is increasing, the current flow through resisters 138 and 140 will be increasing. This tends to stabilize the power capability of the low-voltage power supply 125 under conditions in which the windings are not energized. Under a stall condition, the protective circuitry of ASIC 200 will shut off current flow to the motor windings in order to protect the motor, as described below.

Resistor 144 is a current-limiting resistor that limits the inrush current when power is applied to the control circuit, and also prevents large surges of current in response to voltage surges in the power lines 36, 37. A MOV (metal oxide varistor) 120 is also provided across the power lines 36, 37 as a transient suppressor to absorb power line transients. Connections or pins 1 and 2 of ASIC 200 are connected to the Hall device 439 while pin 4 is grounded. H+ (pin 2) powers the Hall device 439, while HO (pin 1) of ASIC 200 is the output of the Hall device sensed by the ASIC. The Hall device 439 has a high output signal when coupled to one polarity of flux from rotor 54 and a low output with the reverse polarity of flux. The Hall device 439 is pulsed by ASIC 200 as described below in connection with FIG. 22 for 5 microseconds. The ASIC senses the state of the Hall device, and then turns off the power to the Hall device for some 35 microseconds, with the Hall device power averaging only ⅛ of the normal power required for a continuously energized Hall device.

Resistor 130 and capacitor 131 establish an RC time constant that determines the frequency of the oscillator or clock timing in ASIC 200 (as described below in connection with FIG. 22), thereby controlling the time the Hall device 439 is powered on. This RC time constant also determines the timing for the protective start-restart circuit of evaporator fan motor 16 (also discussed below), which protects the motor 16 in the event of a stall. Still further this RC time constant controls the timing for the ASIC 200 logic circuits, and the pulse width modulation (PWM) frequency used during high current conditions.

Pins 5 and 6 of ASIC 200 provide signals to drive or turn the field effect transistor (FET) switches 154 and 156 on and off, as controlled by the ASIC logic in order to control current flow to, and through, the windings of the motor. Pins 5 and 6 of ASIC 200 are connected through resistor 146 and tab 150, and resistor 148 and tab 152, respectively, to the FET switches 154 and 156, respectively. The tabs 150 and 152 are essentially jumpers which can be selectively removed and alternatively inserted instead into the tab openings 162 and 164, respectively, thereby to selectively change the direction of energization of the windings 59 and 61, in order to change the direction of rotation of the motor for applications where a reversed direction of rotation is desired.

Resistor 170 is a motor current shunt resistor that measures or senses the current supplied to motor 16, and this resistor develops a signal responsive to such current which is supplied to ASIC 200 through resistor 172. This motor current signal is provided to ASIC 200 between pins 7 and 4, and is utilized by the ASIC to sense an overcurrent condition, and thus detect motor stalling. In response to such signals, the ASIC limits the power supplied to the motor during starting conditions. High motor current could result, for example, from a motor stall condition, and could cause demagnetization of the permanent magnets on the rotor. ASIC 200 limits the motor current, as part of the motor stall protection (as described in more detail below) and will also limit power to the motor in the event that capacitor 127 fails or shorts.

FIG. 21 also shows the high efficiency power coupling circuit for evaporator fan motor 16. The 115-volt alternating current (AC) lines 36 and 37 are connected through capacitor 127 in power line 36 to the full wave rectifier bridge circuit 128 of the high-voltage power supply. Filter capacitor 142 is connected across bridge circuit 128, and pulsed power is supplied to the motor windings 59 and 61 through FETs (field effect transistors) 154, 156 as controlled by the control circuit which includes Hall device 439 and ASIC 200. Capacitor 127 effectively controls the power input to the coil windings 59 and 61. For example, changing the size of capacitor 127 changes the amount of power supplied to the motor. Thus, the size of capacitor 127 can be selected to selectively vary the power output of the motor 16 (by varying the input power) over a reasonable range without the necessity of making any change in the motor itself (e.g., changing the windings thereof). Variations in the capacitance of capacitor 127 can provide, for example, changes in motor power output of plus or minus 10%. An example of this can be better appreciated by reviewing the data for motors 1 and 2 in Table I hereinabove, wherein a change in size of capacitor 127 alone causes a change of about 4.5% in power output.

If capacitor 127 is made smaller, there will be a higher impedance in the AC power supply, and less power to the motor results, which will cause the motor to run slower under a fixed load condition. Since the tolerances and temperature performances of standard commercial capacitors are quite good, there is only a small temperature coefficient effect, and as a result very little temperature drift problems are associated with relying on capacitor control of motor output. Unlike capacitors, permanent magnets (such as in the rotor 54) have relatively large temperature coefficients, which tend to provide non-uniform motor performance through relatively large variations in the magnetic flux associated with variations in temperature. The use and selection of the capacitance of capacitor 127 for control purposes tends to provide more uniform motor speed even when there are temperature associated variations in the magnetic flux of motor 16.

Capacitor 127 also limits the voltage supplied to, and the power into, evaporator fan motor 16, and thus helps increase the power efficiency of the motor, while at the same time substantially providing desired motor speed, even when there are changes of magnetic flux in the rotor because of temperature changes. While the resultant power saving may be small in many cases, it contributes to the overall improved efficiency of the motor 16, and is cost effective over the normally long operating life of motor 16 when it is used in an application such as a household refrigeration system.

Limitation on the voltage (in the circuit described) also protects the motor 16 from over-voltage conditions resulting from power line surges. Also, the use of capacitor 127 results in requiring motor windings made of fewer turns of larger wire. If other things were kept equal, omission of capacitor 127 would mean that the winding of motor 16 having a given power output would be made of an increased number of turns which would require the use of much smaller diameter wire. However, when capacitor 127 is provided as described, fewer turns of a larger diameter wire were required, minimizing the time and expense required to wind the winding coils for the motor, and making the motor more manufacturable.

Capacitor 127 in the input power circuit also acts as a protective device against damaging current flow in the event of a short in the control circuit, or upon stalling of the evaporator fan motor under abnormal load conditions. It will be understood that a DC motor, upon stalling, does not generate any back emf, and will draw excessive power. The excessive power may be as high as 20–30 watts for motors such as the specific motor 16 described herein, and such an overload can result in overheating, and possible damage to the motor, and particularly to the windings 59, 61. While various devices such as thermal protective devices or cutouts could be used in series with the AC power lines 36, 37, the capacitor 127 will limit the power to evaporator fan motor 16 such that the fan motor 16 input power actually drops, under stall conditions, to about 1.5 watts, with a temperature rise on the order of less than 4° C. (rather than on the order of up to 50° C. in more conventional evaporator fan motors under such conditions).

Additional motor protective means provided in the present invention include motor current limiting and a timed start-restart (operable during fault conditions such as motor stall), and are described below. These means cooperate to further protect the evaporator fan motor 16.

Figures 22, 22A:
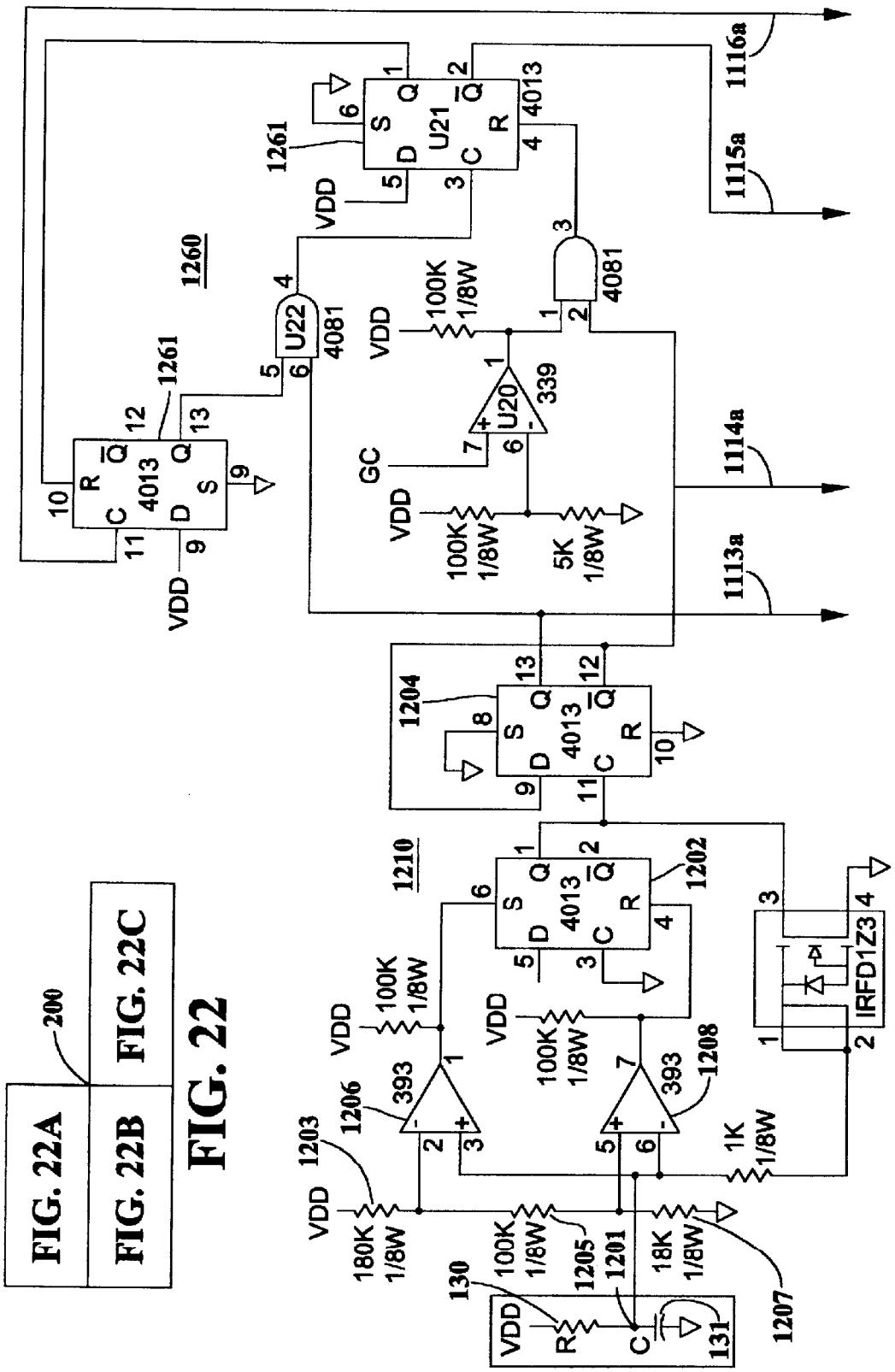
FIG. 22 and associated
FIGS. 22A, 22B and 22C are block and logic diagrams of the circuitry of an integrated circuit device, shown in FIG. 21, used to control the pulsed energization of the Hall sensor and the motor field coils; with FIG. 22 showing the relationship of the circuits of FIGS. 22A, 22B and 22C.
Figure 22B:
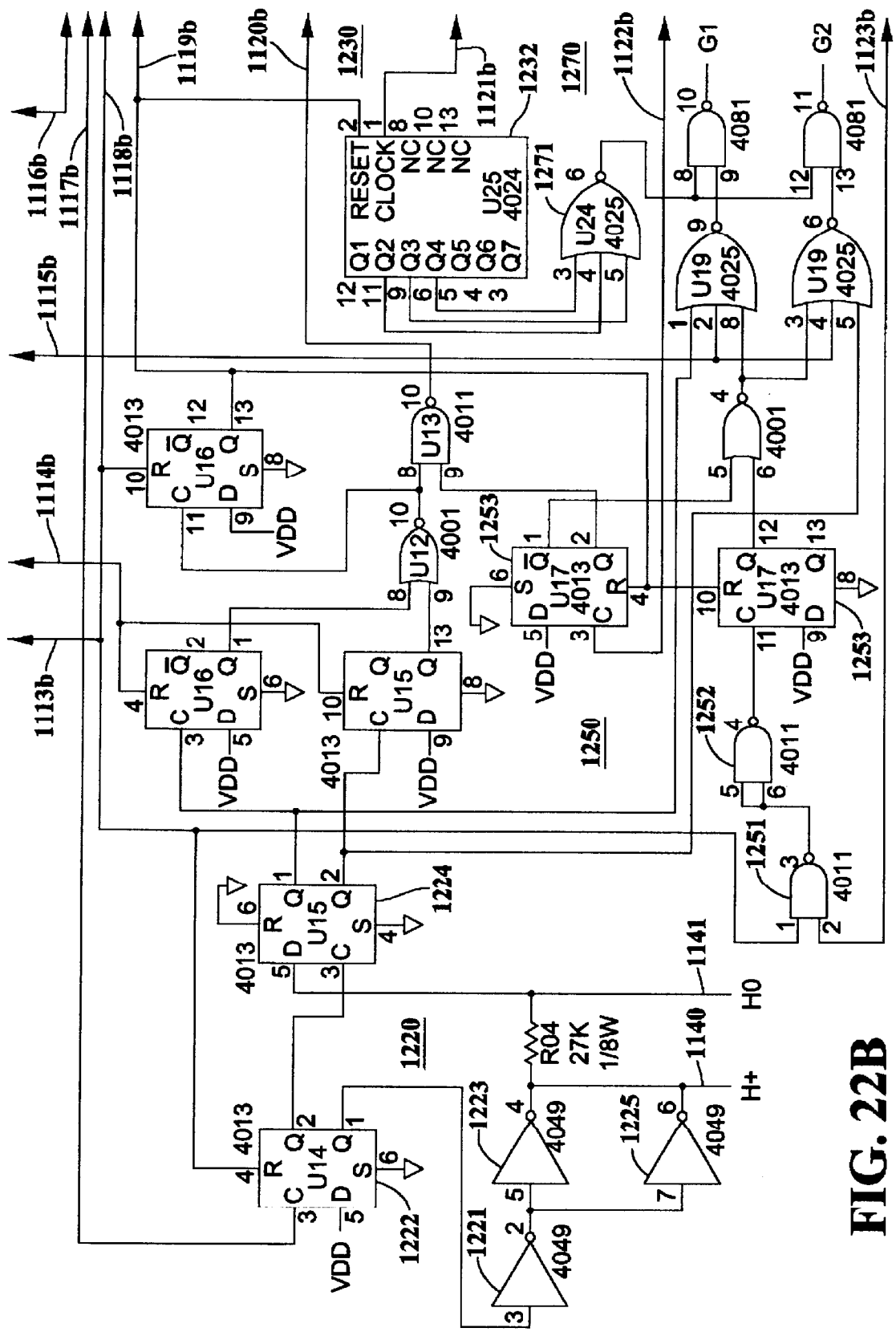
Figure 22C:
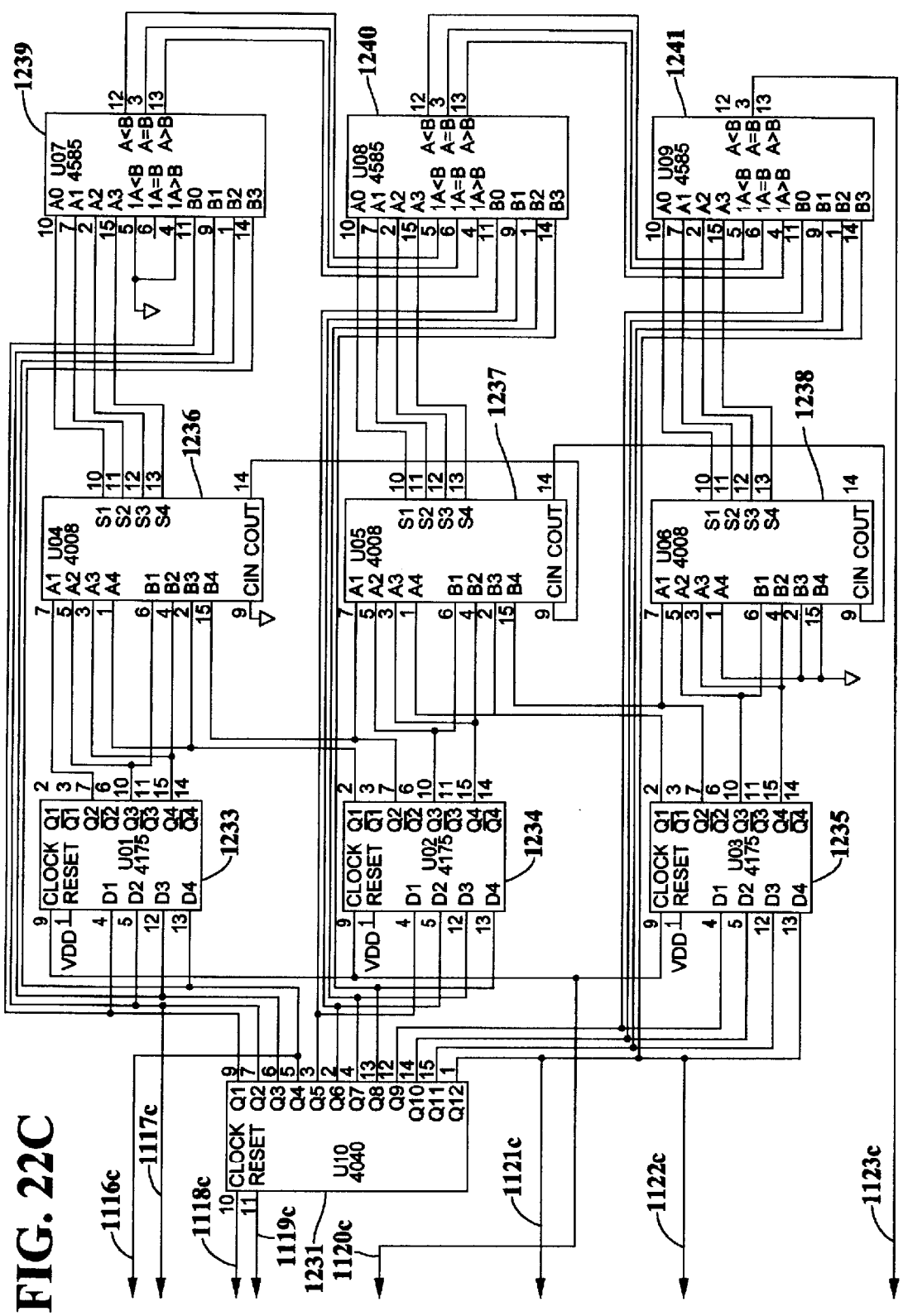

FIGS. 22A, 22B and 22C collectively show the "Application Specific Integrated Circuit" device (ASIC) 200. FIG. 22 shows the connective relationship of the circuit portions shown in FIGS. 22A, 22B, and 22C. Thus, in FIG. 22A, the circuit lines, conductors, or connections numbered 1113*a*, 1114*a*, 1115*a*, 1116*a* match to, and are a continuation of, similar lines or connections 1113*b*, 1114*b*, 1115*b* and 1116*b*, respectively, at the top of FIG. 22B. Similarly, the lines or connections 1116*b*, 1117*b*, 1118*b*, 1119*b*, 1120*b*, 1121*b*, 1122*b* and 1123*b* at the right side of FIG. 22B match to lines or connections 1116*c*, 1117*c*, 1118*c*, 1119*c*, 11120*c* and 11121*c* at the left side of FIG. 22C. As described above, ASIC 200 is connected in circuit with the Hall device 439 and motor windings 59 and 61 as shown in FIG. 21. The series timing circuit including resistor 130 and capacitor 131 discussed above are also connected to ASIC 200.

In FIGS. 22A, B, C, the circuitry and related logic functions of the component parts, circuit elements, or building blocks, forming the circuit of ASIC are described and shown herein consistent with the circuit element identification set forth in the RCA Solid State "CMOS Integrated Circuits" Databook SSD-250C (Copyright 1983 by RCA Corporation, printed in USA 8-83), and in particular the identification for the 4000 Series CMOS Logic. The identifying characters associated with each of the principal circuit elements in FIGS. 22A, B, C identify its specifics in accordance with the just mentioned Databook (hereinafter simply referred to as the CMOS Databook). For example, flip-flop 1202 of FIG. 22A includes the identifying number 4013. The number 4013 indicates that it is part of the 4000 Series CMOS Logic specified in the CMOS Databook, which book is utilized by major integrated circuit manufacturers such as Motorola and Harris, and the contents of which book is hereby incorporated by reference.

While the complete identification for flip-flop 202 in the CMOS Databook would be CD4013B, the associated prefix and suffix letters (e.g., "CD" and "B") for each of the circuit elements are not used in FIG. 22. However, reference to the CMOS Databook provides the specifications, performance, and characteristics of a type 4013 flip-flop 1202 which would enable a competent integrated circuit manufacturer to reproduce this flip-flop circuit as well as the other circuit elements identified in FIG. 22. In an actual reduction to practice of the present invention, integrated CMOS (Complementary Metal Oxide Semiconductor) circuits used as ASIC 200 were made by Integrated Circuit Systems, Inc. of Valley Forge, Pa. based on the information contained in FIG. 22.

In FIG. 22A, ASIC 200 provides the basic timing signals by means of oscillator clock circuit 1210 whose time constant or frequency is determined by the external resistor 30 and capacitor 131 RC network (shown in FIG. 21, and also shown to the left of FIG. 22A). This clock circuit energizes the Hall device for five microsecond pulses. As best appreciated by considering FIG. 21 together with FIG. 22A, junction 1201 of resistor 130 and capacitor 131 is connected to ASIC 200 by a single pin.

With focus now on FIG. 22*a*, a voltage dividing circuit consisting of resistors 1203, 1205, and 1207 is provided in the input circuit of comparators 1206 and 1208, which are the same as National Semiconductor comparators, part LN393. For this reason comparators 1206 and 1208 are designated as type 393 in FIG. 22A. The comparators 1206 and 1208 provide the input to the flip-flop circuits 1202 and 1204, which in turn provide the basic timing and control signals for the logic operation of the circuit. It is to be noted that in FIGS. 21 and 22 the values of the component resistors and capacitors are set forth in the respective schematic drawings for the sake of completeness of disclosure, and that the appropriate values for those devices would be easily determinable by a person skilled in the art.

The Hall driver and decoder circuit 1220 (see the left-hand part of FIG. 22B) includes the flip-flops 1222 and 1224 which, like flip-flops 1202 and 1204, are type 4013, and buffers 1221, 1223 and 1225 (all of which are type 4049). The output of buffers 1223 and 1225 is connected to the Hall sensor 439 plus terminal via line 1140 to provide the pulses which energize the Hall sensor, while the input of the flip-flop 1224 is connected to the Hall output terminal via line 1141.

The pulsing and sampling circuitry of FIG. 22 energizes the Hall sensor 439 for 5 microseconds out of every 40 microseconds, providing a duty or power cycle which is only some $5/40$ or $1/8$ of the case if the Hall sensor were to be energized and operated continuously. Sensing or sampling the Hall sensor 439 during such "on periods" is adequate to provide an indication of polarity or position of rotor 54 for switching or commutating power supplied to the motor windings 59, 61. When desired, the timing and sampling periods may be varied or adjusted for motors operating at different speed ranges by proving a different oscillator frequency for clock circuit 1210. As should be understood, this may be accomplished by using different values for external capacitor 131 and resistor 130, or by using different divider networks. In an actual reduction to practice, the power required by Hall sensor 439 was significantly reduced from 4 milliamps (continuous operation) to 0.5 milliamps ($1/8$ duty cycle), and this would permit a significant reduction in the size of the power supply 125 (which powers ASIC 200 and Hall sensor 439).

The Hall sensor output is used as a control signal to trigger the sequential energization of the stator windings 59 and 61 of the evaporator fan motor 16 through FET switches 154 and 156 (see FIG. 21). Sequential energization of the stator windings provides a rotating magnetic field which reacts with the permanent magnetic field of the rotor 54, and provides the torque which causes rotation of the rotor, and hence mechanical power output at the rotor shaft (more details of which are described in the above-referenced copending U.S. patent application Ser. Nos. 07/661,807 and 07/661,818).

Although magnetic flux created. by an energized winding is proportional to current flow through the winding, during operation of the motor 16, maximum torque, and hence maximum power output, is not continuously produced during continuous maximum current flow through the windings 59 and 61. This result occurs because motor torque and power output are proportional not only to the magnetic flux in the motor windings, but also to the effective flux coupling between the windings and the rotor 54. Changes in magnetic flux coupling result in decreased motor torque during a portion of rotor rotation, notwithstanding the continuous application of full power to the stator windings. This phenomena can be better understood by referring to FIG. 23.

Figure 23:
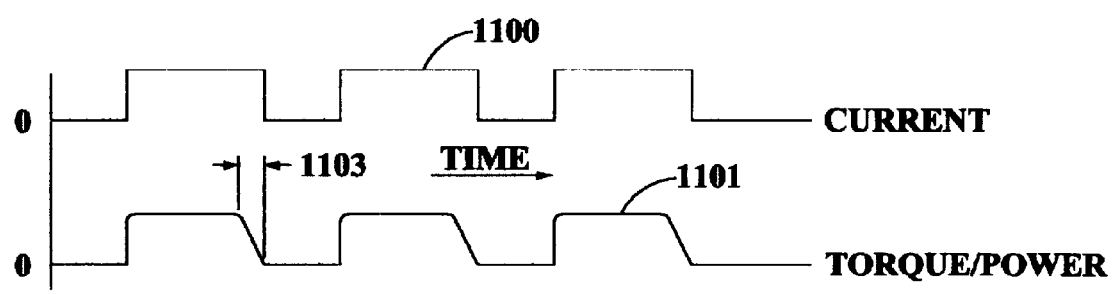
FIG. 23 is a plot of motor winding current flow and the torque/power output of the assembly of FIG. 19.

FIG. 23 shows two plots—one of current flow through (proportional to magnetic flux) windings 59 and 61 against time; and the other of torque or power output plotted against time. As shown by curve 1100, current flow is in the form of a square wave and the curve 1101 is also fairly representative of applied or input power. However, the torque produced (and hence output power) falls off at the end of each cycle of input current or power, as shown in portion 1103 of curve 1101. The reduced motor power output during the periods 1103 occur because of variations in the magnetic coupling between the rotor and stator windings, and the duration of periods 103 is about 20–30 percent of the total power input time represented by curve 1100. We have determined that significant power savings can be made with little or no sacrifice in output performance, by switching off the input power during the low torque-to-current periods 1103 with sub-circuits shown in FIGS. 22B and 22C.

In FIGS. 22B and 22C, the circuitry there shown calculates a desired correct turnoff signal over a wide range of motor speeds in accordance with the present invention. The turnoff signal controls energization of the motor windings as a function of relative rotor position, notwithstanding that the Hall sensor 539, may be indicating that continuous power should be supplied to the motor windings.

More specifically, the commutation turnoff circuit 1230 calculates when a winding should be turned off to enhance the efficiency of the motor, and includes several parts. A commutation time counter includes counters 1231 (see FIG. 22C) and 1232 (types 4040 and 4024, respectively) which count the oscillations provided by the oscillator clock 1210 and thus time the interval between commutations, and also time the pulse width modulation frequency during operation of current limiting circuit 1260 and the timed start retry circuit 1270 (all as described hereinbelow). Switching action is provided by digital latch circuits 1233, 1234, and 1235 (each type 4175) to hold the value of the length of time of the last, or previous, commutation period. That is, the circuit looks at the number of input pulses to the counters, and stores the number of input pulses Ln digital latch circuits 1233, 1234 and 1235.

The adders 1236, 1237 and 1238 (each of which are type 4008) calculate a period which is approximately ¾ of the value held in the latch circuits 1233, 1234 and 1235 by adding together the value of the latch (but shifted two bits toward the Lsb) and the value of the latch shifted one bit toward the Lsb. A digital comparator includes the individual digital comparators 1239, 1240, and 1241 which compare the values of the adders 1236, 1237, and 1238 to the real time count of the counter 1233. During normal running conditions, when the count equals the adder 1236, 1237, and 1238 output, the motor windings are commutated off. The adders 1236, 1237, and 1238 add A to B, and their inputs are connected such that they perform as one unit. The digital comparators 1239, 1241, and 1242 in effect compare the preselected numbers A to B, and when the numbers A and B are equal, the digital comparators provide a control pulse.

Circuit 1250 (see FIG. 22B) includes NAND gates 1251 and 1252 (both of which are type 4011) and flip-flop 1253 (type 4013) which hold the gate drives in the off condition until the next commutation, or alternatively until pin Q12 of counter 1231 goes high. When pin Q12 of counter 1231 goes high, indicating that the motor is either stalled or running very slowly, flip-flop 1253 turns the windings 59 and 61 back on, so that motor starting torque is maintained.

Under conditions of motor stall or some other condition when the motor speed is very low (i.e., substantially below the speed developed during normal running conditions), excessive currents could flow through the motor windings 59 and 61. As mentioned above, normal rotation of the rotor develops a back emf in the motor windings which opposes the applied emf, or line voltage, to effectively limit current flow through the windings during normal operating conditions. However, under stalled or abnormally slow running conditions, the back emf is substantially below that developed during normal running conditions. While capacitor 127 would normally limit motor current under such conditions, if capacitor 127 fails in a shorted condition the desired current limiting action would not take place. Therefore, additional current limiting means are provided to limit the amount of current flow through the motor windings thereby to protect the motor from overheating and possible resultant damage.

The current limiting circuit 1260 (see FIG. 22A) controls the current through the motor windings as set by (see FIG. 21) resistor 170 which is in series with the switching circuit 157. Whenever the motor winding current exceeds the predetermined limit, the gate drives for the power switches (FETS) are forced to zero. Flip-flop 1261 (type 4013) blanks the operation of the current limit operation for intervals of time that the switches (FETs) could possibly turn on, with everything synchronized to the timing signals provided by the oscillator clock 1210. As a result, short turn-on transients are ignored by the current limiting circuit 1260. The action of the gate drive is reenabled by the signal Q4 (supplied via lines 1116c, 1116b, 1116a) of the clock reset counter 1231 (see FIG. 22C), setting the basic pulse width modulation frequency.

Current limiting by current limiting circuit 1260 is provided during starting, during motor stall conditions, and in the event of failure of capacitor 127, This is done to provide thermal overload protection during fault conditions, and to also prevent demagnetizing of the motor rotor magnets during normal starting conditions if low coercivity magnets are used in the rotor. The current limiting circuit 1260 thus limits the magnitude of the current allowed to energize the motor windings by inhibiting or blanking the energization for the windings to prevent motor overheating.

The motor protective start retry circuit 1270 (see FIG. 22B) includes the NOR gate 1271 (type 4025) and provides periodic energization of the evaporator fan motor 16 to restart the motor after circuit 1270 shuts the motor off if a commutation, or normal running speed, is not achieved in a predetermined time. The predetermined time is set by counter inputs to NOR gate 1271. The motor 16 is turned on by this same gate, and with the input shown, the motor is shut off if no commutation is sensed by NOR gate 1271 (after a predetermined time, such as, for example, 0.16 seconds). A motor start retry of 0.25 seconds duration occurs every 1.38 seconds. Thus, the motor is not continuously energized in the event starting (i.e., if commutation) is not achieved, and a periodic retry cycle is provided to reduce motor heating when the rotor is stalled. It is believed that pulsed retry periods will often result in starting of stalled motors, and significantly more starting torque is provided from the motor 16 than would be the case with a shaded pole motor. It should also be understood in connection with the above discussion that the Hall device output signal appears between ground and the Hall device output line 1141.

Use of the various multifunction, multi-purpose components described herein permit easy and economical assembly. Traditional "nuts and bolts" have not been used, and the components of the motor and control assembly herein shown are readily assembled without special tools, jigs, or fixturing.

Also, and as described above in connection with FIGS. 21–23, the control circuit, once operatively connected to the motor 16, results in a motor having reduced power requirements (because of pulsing of the Hall device, and limited periodic energization of coil windings 59 and 61 during periods of greatest power). In addition to greatly increasing the overall power efficiency of the motor, this also enables the use of smaller power supplies. The circuitry and motor construction herein described further provides significant desirable protective and operational features, including impedance stall protection, overheating and burnout protection, resistance to moisture, and start-restart operation in the event of stall or other abnormalities. Still further, we provide desirable means to easily modify or control the power output of the motor over a limited range, and to reverse the direction of rotation of the motor.

The integrated motor and control assembly herein shown requires few parts (which minimize manufacturing costs, including the cost of materials and labor), and the costs and number of components which must be maintained for spare parts or replacement purposes.

Application of our inventions can result in simple, power efficient, motor and control assemblies that are readily manufacturable, and that have desirable operating characteristics and operational features. These assemblies may be compact in size and capable of fitting within the space available in existing designs of refrigeration systems to permit their ready use as a repair or replacement unit, or for incorporation into the original manufacture of systems built according to existing designs.

A specific embodiment of the present invention has been described primarily in connection with a single-phase, two-pole DC brushless motor. However, many of our improvements may be applied to d.c. brushless motors with poles and or winding stages greater than two. Also, while a preferred embodiment of the invention has been described in connection with a refrigeration system evaporator fan motor application, principles of our invention clearly may be applied to motors for other applications, and particularly to other high efficiency applications.

It is to be specifically understood that a motor and control as described herein advantageously may be used for refrigeration condenser fan applications, although changes from the product illustrated herein most likely should be made. For example, a larger motor shaft and bearings having increased load carrying capacity would likely be desirable. Also, the motor and control desirably would be protected from the dusty and dirty environment usually encountered by condenser fan motors in a manner better than what would be expected from the housing 50 alone, which has a number of dust admitting openings therein. Motors built as taught herein may also be used for non-refrigeration system applications. As one such example, motors could be built as taught herein for use as 50 watt output draft inducer fan motors, with essentially the only desirable change being to eliminate the series capacitor for cost reasons (and also because redundant current limiting would not be required).

Accordingly, while the present invention has been described in connection with preferred embodiments, variations will be readily apparent to those skilled in the art from reading the foregoing description and it is to be clearly understood that this description is presented by way of example, and not for purposes of limitation.

What is claimed is:

1. A refrigeration system comprising a compressor, a refrigerant carrying condenser coil, a refrigerant carrying evaporator coil, and at least one air moving motor assembly for moving air across at least one of said refrigerant carrying coils; said air moving motor assembly comprising a brushless DC motor having a permanently magnetizable rotor magnetized to establish at least one north and at least one south pole with a magnetic transition region located between adjacent north and south rotor poles, a C-frame ferromagnetic stator core defining a rotor accommodating bore, and a plurality of energizable winding turns disposed about a portion of the stator core for establishing alternating north and south magnetic poles in the stator core at locations adjacent to the bore; said stator core including a pocket for receiving a magnetic flux sensing device, and said bore having a discontinuity therealong so that magnetic flux associated with the rotor is not shielded from the pocket by ferromagnetic stator core material; said bore further including at least two stepped regions each having an arcuate extent of about thirty-five degrees, with the depth of the step in each of the two stepped regions being at least about 1.0 mm; and said bore further having a region establishing a magnetic flux path anomoly at a location on the bore opposite the location of the bore discontinuity.

2. The system of claim 1 wherein the rotor is comprised of at least three magnet segments, and wherein any magnetic transition region located along any given magnet segment is located at least about 30° from an edge of said given segment.

3. The system of claim 1 wherein the air moving motor assembly comprises a condenser fan motor and control; said control includes at least one motor stall protection circuit element, at least one circuit element for protecting the motor from overcurrent conditions, and at least one circuit element for inhibiting the supply of power to the motor during a portion of each revolution of the rotor during at least part of the interval during a revolution that corresponds to reduced magnetic coupling between the rotor and stator.

4. The system of claim 1 wherein the air moving motor assembly comprises an evaporator fan motor comprising a core and winding, and a control disposed within an insulated enclosure cooled by said system wherein, for each given watt of input power to said air moving motor, said system must consume additional power in excess of each said given watt of input power in order to dissipate the heat produced by each such given watt; said control including a capacitor in series with the motor winding; said capacitor providing stall protection for the motor and contributing to increased operating efficiency of the motor.

5. An assembly for use as a brushless DC motor having a permanently magnetizable rotor magnetized to establish at least one north and at least one south pole with a magnetic transition region located between adjacent north and south rotor poles, a C-frame ferromagnetic stator core defining a rotor accommodating bore, and a plurality of energizable winding turns disposed about a portion of the stator core for establishing alternating north and south magnetic poles in the stator core at locations adjacent to the bore; said stator core including a pocket for receiving a magnetic flux sensing device, and said bore having a discontinuity therealong so that magnetic flux associated with the rotor is not shielded from the pocket by ferromagnetic stator core material; said rotor comprising at least three circumferentially extending magnet segments, and wherein any magnetic polar transition region located along any given magnet segment is located at least about 30° from an edge of said given segment.

6. The assembly of claim 5 wherein the rotor magnets are contained within a deep drawn one piece stainless steel cup, pressed over the magnets, and having a wall thickness of about 0.15 mm; and wherein the cup is closed at the open end thereof by a disk.

7. The assembly of claim 5 wherein the rotor magnets are ferrite material having a density of at least about 4.8 grams per cubic centimeter.

8. An assembly for use as a brushless DC motor having a permanently magnetizable rotor magnetized to establish at least one north and at least one south pole with a magnetic transition region located between adjacent north and south rotor poles, a C-frame ferromagnetic stator core defining a rotor accommodating bore, and a plurality of energizable winding turns disposed about a portion of the stator core for establishing alternating north and south magnetic poles in the stator core at locations adjacent to the bore; said stator core including a pocket for receiving a magnetic flux sensing device, and said bore having a discontinuity therealong so that magnetic flux associated with the rotor is not shielded from the pocket by ferromagnetic stator core material; said bore further including at least two stepped regions each having an arcuate extent of thirty-five to forty-five degrees, with the depth of the step in each of the two stepped regions being at least about 1.0 mm; and said bore further having a region establishing a magnetic flux path anomoly at a location on the bore opposite the location of the bore discontinuity.

9. The assembly of claim 8 wherein the rotor is comprised of at least three magnet segments, and wherein any magnetic transition region located along any given magnet segment is located at least about 30° from an edge of said given segment.

10. The assembly of claim 8 wherein the magnetic anomoly constitutes a section of the bore having a non-curvilinear shape.

11. The assembly of claim 8 wherein the plurality of energizable winding turns include two winding coils that are alternately energizable for establishing the magnetic poles of the stator.

12. The assembly of claim 8 wherein the assembly further includes a plurality of motor control circuit components and a substrate to which at least one of said components is mounted; said components including a rotor position sensing device disposed in said pocket and also mounted to said substrate, and at least one capacitor arranged to control the power supplied to the energizable winding turns.

13. An assembly for use as a brushless DC motor having a permanently magnetizable rotor magnetized to establish at least one north and at least one south pole with a magnetic transition region located between adjacent north and south rotor poles, a C-frame ferromagnetic stator core defining a rotor accommodating bore, and a plurality of energizable winding turns disposed about a portion of the stator core for establishing alternating north and south magnetic poles in the stator core at locations adjacent to the bore; said stator core including a pocket for receiving a magnetic flux sensing device, and said bore having a discontinuity therealong so that magnetic flux associated with the rotor will not be shielded from the pocket by ferromagnetic stator core material; said bore further including at least two stepped regions each having an arcuate extent of about thirty-five degrees, with the depth of the step in each of the two stepped regions being at least about 1.0 mm; and said bore further having a region establishing a magnetic flux path anomoly at a location on the bore opposite the location of the bore discontinuity.

* * * * *